US006867731B2

(12) United States Patent
Dizaji et al.

(10) Patent No.: US 6,867,731 B2
(45) Date of Patent: Mar. 15, 2005

(54) NOISE SUPPRESSION SYSTEM AND METHOD FOR PHASED-ARRAY BASED SYSTEMS

(75) Inventors: Reza Dizaji, Waterloo (CA); Tony Ponsford, Waterloo (CA); Rick McKerracher, Waterloo (CA)

(73) Assignee: Raytheon Canada Limited, Ontario (CA)

(*) Notice: Subject to any disclaimer, the term of this patent is extended or adjusted under 35 U.S.C. 154(b) by 254 days.

(21) Appl. No.: 10/384,203

(22) Filed: Mar. 7, 2003

(65) Prior Publication Data

US 2003/0210179 A1 Nov. 13, 2003

Related U.S. Application Data

(60) Provisional application No. 60/363,570, filed on Mar. 13, 2002, and provisional application No. 60/365,152, filed on Mar. 19, 2002.

(51) Int. Cl.[7] .............................................. G01S 13/00
(52) U.S. Cl. ...................................... 342/159; 342/192
(58) Field of Search ................................. 342/159, 192

(56) References Cited

U.S. PATENT DOCUMENTS 5,729,465 A * 3/1998 Barbaresco ................. 702/76
5,784,403 A * 7/1998 Scott ........................... 375/151
5,786,788 A * 7/1998 Schober et al. ............. 342/159
5,901,059 A * 5/1999 Tao et al. ..................... 700/29
6,363,107 B1 * 3/2002 Scott ........................... 375/150

FOREIGN PATENT DOCUMENTS

WO       WO 00/30264        5/2000

OTHER PUBLICATIONS

International Search Report of PCT Application No. PCT/US03/06959 dated Sep. 12, 2003.

* cited by examiner

*Primary Examiner*—Stephen C. Buczinski
(74) *Attorney, Agent, or Firm*—Daly, Crowley & Mofford, LLP

(57) ABSTRACT

This invention relates to a system and method for suppressing external interference in radar data provided by a plurality of sensors from a main sensor array, the data being preprocessed. The noise suppression system includes a first processing module and a second processing module. The first processing module receives the radar data and produces matched radar data while the second processing module receives the radar data and produces mis-matched radar data. The system further includes a beamformer that is in communication with the first processing module and an adaptive beamformer that is in communication with the second processing module and the beamformer. The beamformer receives the matched radar data and produces beamformed matched radar data.

30 Claims, 19 Drawing Sheets

Co-channel interference

NOISE SUPPRESSION SYSTEM AND METHOD FOR PHASED-ARRAY BASED SYSTEMS

CROSS REFERENCE TO RELATED APPLICATIONS

This application claims priority under 35 U.S.C. §119 (e) to provisional application Ser. No. 60/363,570 filed Mar. 13, 2002, and to provisional application Ser. No. 60/365,152 filed Mar. 19, 2002, the disclosures of which are hereby incorporated by reference.

FIELD OF THE INVENTION

The present invention relates to noise reduction in phased-array systems, and more particularly, to a system and method for noise reduction in phased-array systems using adaptive array processing.

BACKGROUND OF THE INVENTION

High Frequency Surface Wave Radar (HFSWR) is effective for the continuous detection and tracking of ships, aircraft, icebergs and other surface targets from a shore based location. Accordingly, HFSWR is being used to enhance search and rescue activities as well as to monitor sea state, illegal immigration, drug trafficking, illegal fishing, smuggling and piracy.

An HFSWR system is installed along a coastal line and includes a directional transmitting antenna and an omni-directional receiving antenna array that are both directed towards the ocean, as well as the hardware and software needed for system operation. The transmitting antenna generates a train of electromagnetic (EM) pulses which illuminate a desired surveillance area. The receiving antenna array should preferably have high and equal gain over the entire surveillance area. Objects in the surveillance area then reflect the EM pulses towards the receiving antenna array which collects radar data. Some of the objects may be elements that must be detected (the radar signatures from these elements are referred to as "targets") while the rest of the objects are elements that do not have to be detected (the radar signatures from these elements are referred to as "clutter" which is one type of noise in a radar system). More sophisticated pulse-coded or frequency-coded EM pulses may be used to combat range-wrap which occurs when a reflected EM pulse (in response to a previously transmitted EM pulse) is received by the receiving antenna array after subsequent EM pulses have been transmitted.

Conventionally, the collected radar data from each antenna element, or sensor, in the receiving antenna array is then preprocessed by passing the data through a bandpass filter to filter extraneous unwanted signals in the radar data, and then through a heterodyne receiver which demodulates the radar data from the RF band to an IF band where analog to digital conversion occurs. The radar data is then demodulated to the baseband where low-pass filtering and downsampling occurs. The radar data collected by the receiving antenna array is complex (i.e. has real and imaginary components). Accordingly, the downsampled radar data is also complex and each of the signal processing components required to perform the above-mentioned operations are implemented to handle complex data.

The downsampled radar data is then processed by a matched filter that has a transfer function or impulse response that is related to the transmitted EM pulse. The matched filtered radar data is then separated into segments for analysis. Each segment is known in the art as a coherent integration time (CIT) or a dwell. The matched filtered radar data in each CIT is range-aligned by noting the time at which each data point was sampled relative to the time that a preceding EM pulse was transmitted. The range-aligned data is then subjected to a combination of low-pass filtering for noise reduction and downsampling for more efficient signal processing. The output of this processing is a plurality of time series of range data where each time series is collected for a given range value. The maximum range value for which the plurality of time series is collected depends on the pulse repetition interval used in transmitting the EM pulses (i.e. the frequency at which EM pulses are transmitted).

A target is detected from range, doppler and azimuth information that is generated from the pre-processed recorded radar data. The range information is used to provide an estimate of the target's distance from the receiving antenna array. The azimuth information is used to provide an estimate of the angle of the target's location with respect to the center of the receiving antenna array, and the doppler information is used to provide an estimate of the target's radial velocity by measuring the target's doppler shift. The target's doppler shift is related to the change in frequency content of the EM pulse that is reflected by the target with respect to the original frequency content of that EM pulse.

As mentioned previously, range data is generated by noting the time at which data is sampled relative to the time at which a preceding EM pulse is transmitted. Doppler processing corresponds to the detection of a sinusoidal signal of frequency $\Delta f$ at the pulse repetition period (i.e. the time between consecutive transmitted pulses in the coherent pulse train). Accordingly, doppler information is generated for a given range value by subjecting the time series obtained for that range value to filter bank processing or FFT processing. The azimuth data is conventionally obtained by digital beamforming. More specifically, the radar data at a given range cell and a given doppler cell is weighted by a complex exponential for each antenna element of the receiving antenna array and then summed across all antenna elements. The phase of the complex exponential is related to the azimuth angle, the antenna element spacing and the wavelength of the transmitted EM pulses as is well known to those skilled in the art. Beamforming gives the appearance that the antenna array is tuned to a certain region of the surveillance area defined by the azimuth value in the complex exponential weights. In this fashion, many beams may be formed to simultaneously cover the entire surveillance area.

To determine a target's range, azimuth and velocity, a detector processes the generated range, azimuth and doppler information for a given CIT. In general, the detector looks for peaks at a given cell (i.e. a data value or pixel) in a two dimensional plot known as a range-doppler plot. Target detection usually comprises comparing the amplitude in a given cell with the average amplitude in neighboring cells. The detected targets are then forwarded to a plot extractor which filters the detected targets to reject all of those detections that do not conform to the range, doppler and azimuth properties that are expected for a true target. These filtered targets are then forwarded to a tracker which associates successive detections of a given target to form a track for the target. In this fashion, the movement of a detected target may be tracked throughout the surveillance area.

The detection process is hindered by the addition of noise, which includes the clutter previously mentioned, in each cell which may result in the missed detection of a target or the false detection of noise as a target. The noise is problematic since there will be a varying noise level in different cells as well as for radar data collected in different CITs, in different sea-state conditions, during different times of day and season and at different locations. The major sources of radar noise include self-interference, such as ocean clutter, ionospheric clutter and meteoroid clutter, and external interference such as co-channel interference, atmospheric interference and impulsive noise. Self-interference results from the operation of the radar while external interference is independent of radar operation.

Ionospheric clutter is one of the most significant causes of interference and is difficult to suppress due to its target-like nature and high signal amplitude. Ionospheric clutter includes EM pulses that reflect off of the earth's ionosphere and return directly to the radar (i.e. near vertical incidence clutter), and EM pulses that bounce off of the ionosphere, reflect from the ocean and return to the radar along the reverse path (i.e. range-wrap clutter). In general, ionospheric clutter accumulates in an annular band spanning several range cells, all azimuth cells and most of the ship doppler band. These range cells correspond to the height or multiple heights of the ionospheric layers relative to the HFSWR installation site. Near vertical incidence ionospheric clutter is also characterized as being very strong, isolated in range and smeared in the doppler dimension over many milli-Hertz. During the night, ionospheric clutter is at its highest level due to the disappearance of the ionospheric D layer and the merging of the ionospheric F1 and F2 layers.

To combat range-wrap clutter, Frank complementary codes may be used as is known to those skilled in the art. Another known solution is to operate the radar system at a higher frequency that does not support sky-wave propagation. By increasing the carrier frequency of the transmitted EM pulses above the layer critical frequency, the transmitted EM pulses will penetrate through the ionospheric layers. However, this approach may decrease the performance of the radar system in detecting ships at long range due to the greater propagation loss that is incurred at higher transmission frequencies.

Ocean clutter results from EM pulses that are reflected by ocean waves that are harmonics of the radar wavelength. Two large peaks that dominate ocean clutter are referred to as Bragg lines which appear as two columns of peaks in a range-doppler plot along all range cells at doppler frequencies determined by the radar operating frequency. The Bragg lines can smear radar detection performance at their corresponding doppler frequencies. However, there is also higher order scatter, related to the sea-state, that results in additional peaks and a continuum of ocean clutter between the Bragg lines. This continuum of ocean clutter contains energy that is related to the sea-state (i.e. surface wind speed and duration) often limits the detection of small, low-speed targets such as ships.

Meteoroid clutter results from meteoroids which are small meteor particles that penetrate the Earth's atmosphere and generate ionization trails that produce transient radar returns. A transient meteoroid radar return usually appears as a large peak at a specific range. Meteoroid clutter results in an increase of the background noise level in range-doppler plots.

Co-channel interference results from both local and distant users of the HFSWR frequency band, such as television broadcasters. This interference is highly directive because it originates from spatially correlated point sources. However, due to multiple reflections in non-uniform ionospheric layers, the direction of arrival of co-channel interference is wide as can be seen from a sample of real radar data shown in FIG. 1. Co-channel interference is also range independent and occurs at specific doppler frequencies as can be seen from another sample of real radar data shown in FIG. 11a. Co-channel interference may be avoided by choosing alternate carrier frequencies for transmitting the EM pulses. However, co-channel interference from distant sources poses a more serious problem since this interference is more random in time and frequency. Furthermore, there is typically greater co-channel interference at night than during the day due to the lack of D layer absorption during the night.

Atmospheric interference is spatially white with a level that varies as a function of frequency, time of day, season and geographical location. For instance, the noise level due to atmospheric interference at the lower end of the HF band, increases about 20 dB during the night in comparison with daytime levels Impulsive noise is due to lightning and manifests itself as a sequence of rapid pulses that are randomly distributed in time and have an amplitude with a large dynamic range. This can be seen in FIG. 2 which shows a sequence of radar EM pulse returns plotted versus transmitted EM pulse number (or pulse index) for a given range value. Impulsive noise is not spatially white and results from both local and distant storms. Impulsive noise usually occurs throughout the daily operation of an HFSWR system. Impulsive noise has a doppler spread that is relatively short in duration and may resemble a maneuvering target. Impulsive noise results in an increase in the background noise level. The frequency characteristics of impulsive noise change as a function of the intensity of local storm activity.

Self-generated clutter may be successfully reduced by using sophisticated signal processing methods developed by the inventors of the present invention and described in co-pending patent application filed concurrently herewith having Ser. No. 10/383,775 and entitled "System and Method For Spectral Generation in Radar". However, after applying these signal processing methods, the range-doppler-azimuth data still contains external interference comprised mainly of co-channel interference and impulsive interference.

Prior art external interference cancellation techniques have exploited the directional characteristics of external interference signals. These techniques employ a main antenna or main antenna array to obtain radar data containing possible targets as well as external interference and an auxiliary antenna or an auxiliary antenna array to estimate the external interference only. However, these methods require the additional hardware of an auxiliary antenna or an auxiliary antenna array. One prior art solution to this problem involves using a receiving antenna array in which some of the array elements are used as the main antenna array and some of the array elements are used as the auxiliary array. However, this results in a main antenna array having a smaller aperture (i.e. a smaller number of antenna elements) which degrades azimuthal resolution. Accordingly, there is a need for a noise reduction system which does not require the additional hardware of an auxiliary antenna array and does not degrade the azimuthal resolution of the main antenna array.

SUMMARY OF THE INVENTION

The inventors of the present invention have developed a noise suppression system that uses a combination of adaptive array processing and matched/mis-matched filtering. In the noise suppression system, the pre-processed data from a main sensor array is communicated to matched and mis-matched filter modules. The matched filter module provides matched radar data that contains radar returns from possible targets, self-interference and external interference while the mis-matched filter module provides mis-matched radar data that contains only external interference. Accordingly, the mis-matched radar data is used to provide an estimate of the external interference in the matched radar data.

The matched radar data is tuned to a desired azimuth by using beamforming, as is commonly known in the art, in effect producing a main beam directed along a desired azimuth. The mis-matched radar data allows for the construction of a virtual auxiliary sensor array, with sensors selected from the main sensor array, to adaptively form an auxiliary beam. The auxiliary beam is tuned such that the external interference in the auxiliary beam provides an estimate of the external interference in the main beam. The adaptive beamforming involves generating an adaptive weight vector according preferably to Wiener theory to tune the auxiliary beam. The adaptive weight vector is chosen such that the error between the estimate of external interference provided by the auxiliary beam and the external interference in the main beam is minimized in a mean square error sense.

The virtual auxiliary sensor array may comprise either all the sensors of the main sensor array or a subset of the sensors from the main sensor array. In both cases, none of the sensors from the main sensor array are sacrificed to only produce an estimate of the external interference thus avoiding azimuthal degradation. Furthermore, the extra hardware of a physically separate auxiliary array is also avoided.

Accordingly, in one aspect, the present invention is a noise suppression system for suppressing external interference in radar data provided by a plurality of sensors from a main sensor array that has been pre-processed. The noise suppression system has a first processing module and a second processing module. The first processing module receives the radar data and produces matched radar data while the second processing module receives the radar data and produces mis-matched radar data. The system further has a beamformer that is in communication with the first processing module and an adaptive beamformer that is in communication with the second processing module and the beamformer. The beamformer receives the matched radar data and produces beamformed matched radar data. The adaptive beamformer receives a portion of the beamformed matched radar data and a portion of the mis-matched radar data and produces an external interference estimate of the external interference in the portion of beamformed matched radar data. The system further has a suppressor that is in communication with the beamformer and the adaptive beamformer. The suppressor produces a portion of noise suppressed beamformed matched radar data based on the portion of beamformed matched radar data and the external interference estimate.

In a second aspect, the present invention provides a noise suppression method for suppressing external interference in radar data provided by a plurality of sensors from a main sensor array that has been pre-processed. The method includes:

processing the radar data to produce matched radar data;

processing the radar data to produce mis-matched radar data;

beamforming the matched radar data to produce beamformed matched radar data;

selecting a portion of the beamformed matched radar data and a portion of the mis-matched radar data and performing adaptive beamforming to produce an external interference estimate of the external interference in the beamformed matched radar data; and, producing a portion of noise suppressed beamformed matched radar data by suppressing the external interference estimate from the portion of beamformed matched radar data.

In another aspect, the present invention provides a noise suppression system for suppressing external interference in radar data that is provided by a plurality of sensors from a main sensor array and has been pre-processed. The noise suppression system has a first processing module and a second processing module. The first processing module receives the radar data and produces matched radar data while the second processing module receives the radar data and produces mis-matched radar data. The system further includes a beamformer, in communication with the first processing module, and an ordered-statistics filter module in communication with the beamformer. The beamformer receives the matched radar data and produces beamformed matched radar data. The ordered-statistics filter module receives the beamformed matched radar data and produces ordered-statistics filtered beamformed matched radar data. The system also includes an adaptive beamformer that is in communication with the second processing module and the ordered-statistics filter module. The adaptive beamformer receives a portion of the ordered-statistics filtered beamformed matched radar data and a portion of the mis-matched radar data and produces an external interference estimate of the external interference in a portion of beamformed matched radar data. The system also has a suppressor that is in communication with the beamformer and the adaptive beamformer. The suppressor produces a portion of noise suppressed beamformed matched radar data based on the portion of beamformed matched radar data and the external interference estimate.

In a further aspect, the present invention provides a noise suppression method for suppressing external interference in radar data provided by a plurality of sensors from a main sensor array that has been pre-processed. The method comprises:

processing the radar data to produce matched radar data;

processing the radar data to produce mis-matched radar data;

beamforming the matched radar data to produce beamformed matched radar data;

performing ordered-statistic filtering on the beamformed matched radar data to produce ordered-statistic filtered beamformed matched radar data;

selecting a portion of the ordered-statistic filtered beamformed matched radar data and a portion of the mis-matched radar data and performing adaptive beamforming to provide an external interference estimate of the external interference in the beamformed matched radar data; and, producing a portion of noise suppressed beamformed matched radar data by suppressing the external interference estimate from a portion of beamformed matched radar data.

BRIEF DESCRIPTION OF THE DRAWINGS

For a better understanding of the present invention and to show more clearly how it may be carried into effect, reference will now be made, by way of example only, to the accompanying drawings which show preferred embodiments of the present invention and in which:

FIG. 4a is a schematic of a main beam produced by a main sensor array;

FIG. 4b is a schematic of an auxiliary beam produced by a virtual auxiliary sensor array;

FIG. 4c is a schematic of the auxiliary beam of FIG. 4b overlaid on the main beam of FIG. 4a;

DETAILED DESCRIPTION OF THE INVENTION

Figure 1:
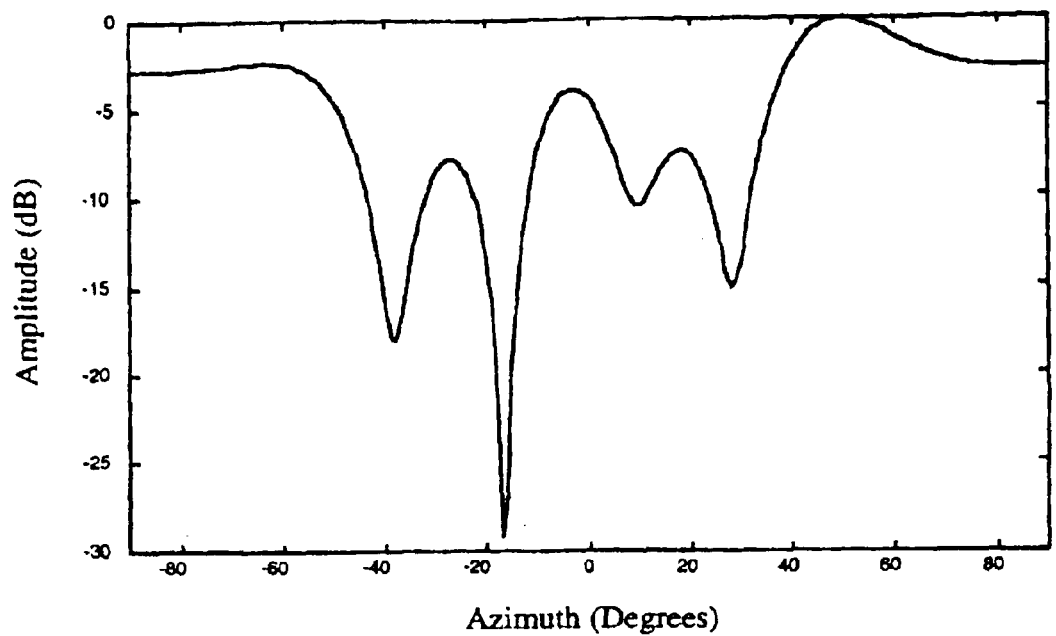
FIG. 1 is a plot of amplitude versus azimuth for the beam pattern of a radar receiving array in the presence of external interference.
Figure 2:
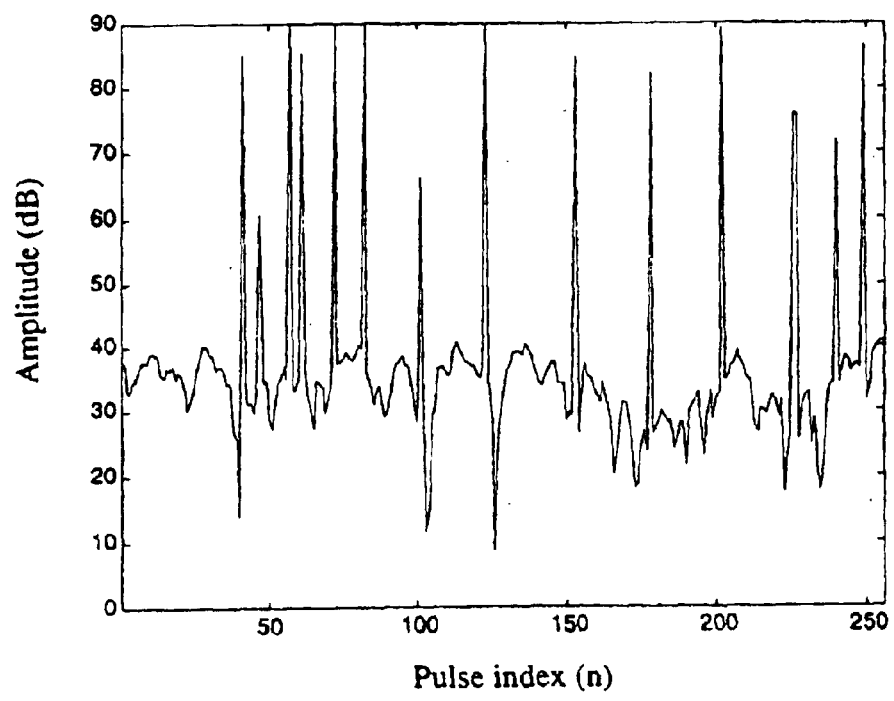
FIG. 2 is a plot of amplitude versus pulse index showing the effect of impulsive noise on the radar data at a given range.

All of the experimental data shown herein has been taken from the SWR-503™ HFSWR system located at Cape Race, Newfoundland, Canada. The SWR-503™ HFSWR system was developed by Raytheon Canada Limited. The SWR-503 HFSWR system comprises a receiving antenna array having 16 antenna elements (i.e. a main sensor array having 16 sensors).

As used herein, each of the terms "range data", "doppler data", "azimuth data", "sensor data" or "pulse data" denotes a one-dimensional series of data points in a given domain. Furthermore, the term "range-doppler data" denotes two-dimensional data for a given azimuth or for a given sensor and the term "range-sensor data" denotes two-dimensional data for a given doppler value or a given pulse index. In addition, the terms "range-pulse-sensor", "range-doppler-sensor" and "range-doppler-azimuth data" denotes three-dimensional data. Furthermore, the term "a portion" of data means that the portion of data has a dimension smaller than the data from which it was obtained. Accordingly, a portion of data may be one-dimensional or two-dimensional when the portion of data is taken from a three-dimensional data set.

As mentioned previously, self-generated interference occurs in response to the transmitted EM pulses. Accordingly, when the radar data recorded by the receiving antenna array is passed through a matched filter that is matched to the transmitted EM pulses, the self-generated interference as well as the radar returns from possible targets will appear at the output of the matched filter. If the data recorded by the receiving antenna array were passed through a second filter that had an impulse response that was orthogonal to the transmitted EM pulses, then the self-generated interference and the radar returns from possible targets would not appear in the output of the second filter. However, external interference is independent of radar operation and will be present at the output of both the matched filter and the second filter.

The second filter is a mis-matched filter. A matched filter has a transfer function that contains the same frequency components as the signal that the matched filter is matched to. Alternatively, a mis-matched filer has a transfer function that is the opposite of that of the matched filter. Accordingly, the transfer function of a mis-matched filter does not contain any frequency components in the aforementioned signal. Matched and mis-matched filters are defined as having zero cross-correlation. This means that the output of the mis-matched filter should be uncorrelated of the output of the matched filter that is matched to the transmitted EM pulse.

Accordingly, the mis-matched filter will provide an output that may be used as an observation of the external interference that is present in the output of the matched filter. It is therefore possible to use a single receiving antenna array to provide radar data for detecting radar returns from possible targets as well as radar data for estimating external interference without encountering the disadvantages of prior art noise reduction schemes (i.e. requiring additional receiving antenna elements or using some elements of the receiving antenna array for external interference estimation only, thereby sacrificing azimuthal resolution).

Figure 3:
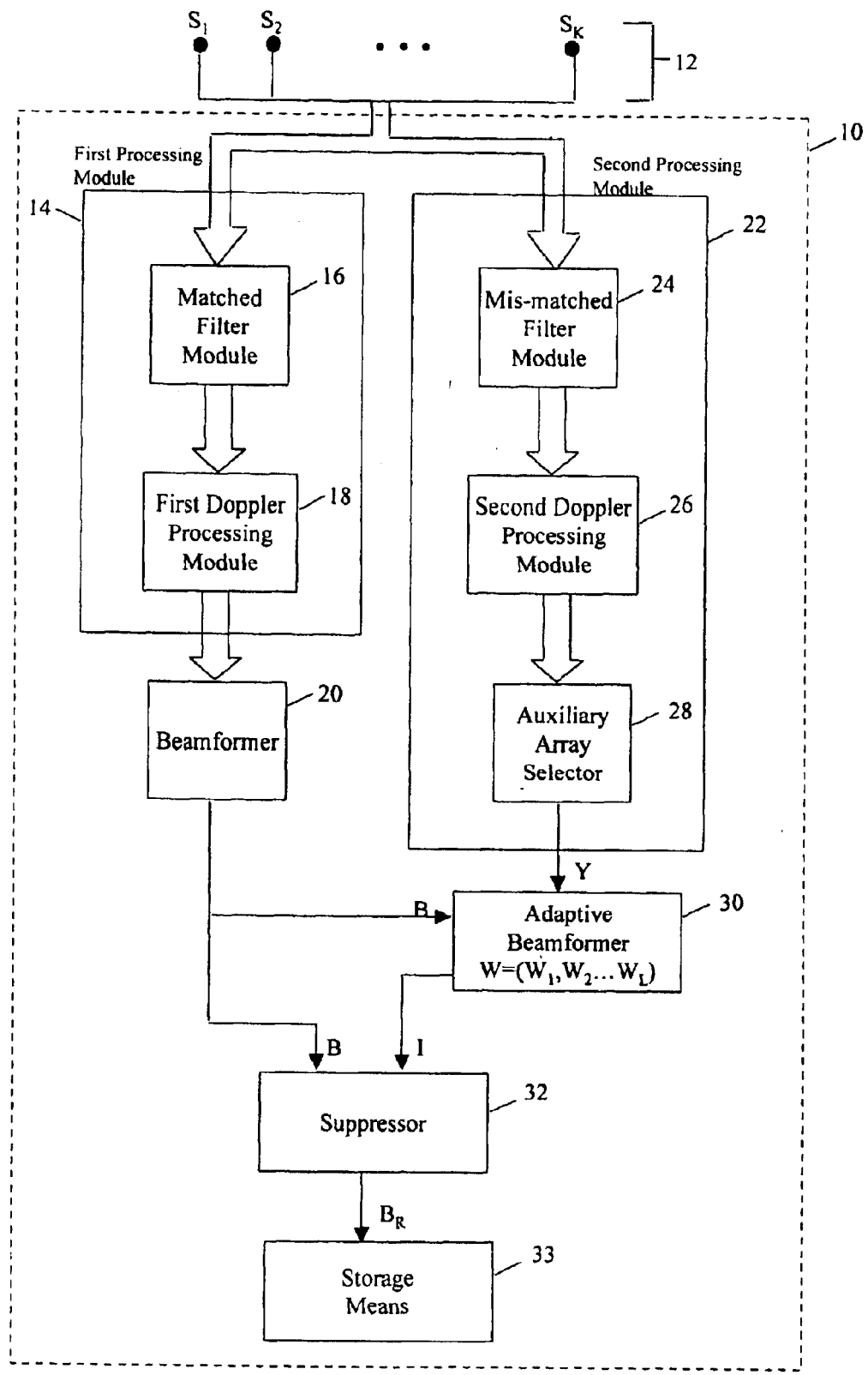
FIG. 3 is a block diagram of a noise suppression system in accordance with the present invention.

Referring now to FIG. 3, shown therein is a block diagram of a noise suppression system 10 in accordance with the present invention. The functionality of the components of the noise suppression system 10 will now be discussed. Specific implementation issues will be discussed further below. The noise suppression system 10 is in communication with a main sensor array 12 having a plurality of sensors $S_1, S_2, \ldots S_K$, to provide range-pulse-sensor data which is explained in further detail below. Each sensor may be any receiving antenna element known to those skilled in the art that is suitable for receiving radar signals. Furthermore, it should be understood by those skilled in the art that the radar data collected by the main sensor array 12 is subjected to conventional signal processing operations to pre-process the radar data. The conventional signal processing operations include bandpass filtering, heterodyning, A/D conversion, demodulation and downsampling. The components to effect these signal processing operations are well known in the art and are not shown in any of the Figures contained herein. Furthermore, it should be understood that all of the elements of the invention allow for the processing of data which is complex (i.e. has real and imaginary parts). The remainder of the noise suppression system 10 operates on the pre-processed radar data.

The noise suppression system 10 comprises a first processing module 14 having a matched filter module 16, in communication with the main sensor array 12, and a first doppler processing module 18, in communication with the matched filter module 16. The matched filter module 16 receives the pre-processed radar data derived from radar data recorded by the main sensor array 12 and performs matched filtering on the data to produce matched radar data. The first doppler processing module 18 then receives the matched radar data and performs doppler processing on the data to produce matched range-doppler data.

Figures 4A, 4B, 4C:
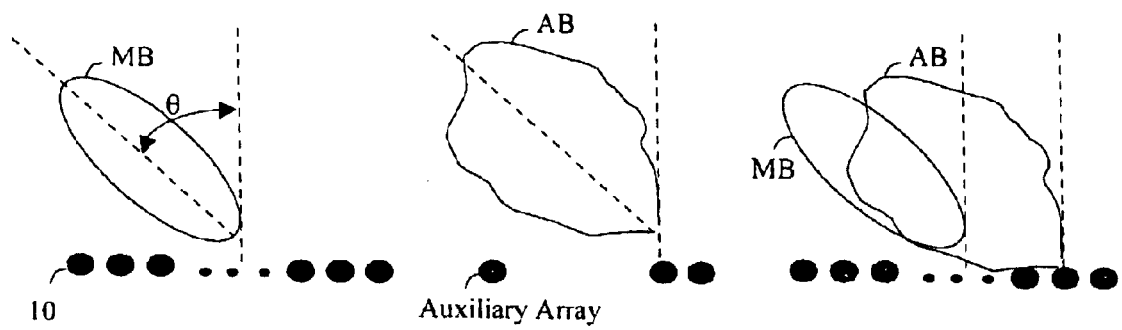

The noise suppression system 10 further comprises a beamformer 20 that is in communication with the first processing module 14 to receive the matched range-doppler data. The beamformer 20 produces matched range-doppler-azimuth data for a desired number of azimuth values. Accordingly, for a given azimuth θ, the beamformer 20 produces a main beam MB for which the matched range-doppler data is tuned (see FIG. 4a). The number of azimuth values may be preselected by a user of the noise suppression system 10. A portion of the beamformed matched range-doppler-azimuth data B is then selected for further processing by the noise suppression system 10 as described further below.

The noise suppression system 10 also comprises a second processing module 22 having a mis-matched filter module 24, in communication with the main sensor array 12, a second doppler processing module 26, in communication with the mis-matched filter module 24, and an auxiliary array selector 28 in communication with the second doppler processing module 26. The mis-matched filter module 24 receives the pre-processed radar data derived from radar data recorded by the main sensor array 12 and performs mis-matched filtering to produce mis-matched radar data. The second doppler processing module 26 then receives the mis-matched radar data and performs doppler processing to produce mis-matched range-doppler data. The auxiliary array selector 28 then receives the mis-matched range-doppler data and constructs a virtual auxiliary sensor array having sensors $A_1, A_2, \ldots, A_L$ (not shown), selected from the main sensor array 12 from which a portion of the mis-matched range-doppler-sensor data Y is used to produce an interference estimate as described further below.

The virtual auxiliary sensor array may comprise either all or a subset of the sensors $S_1, S_2, \ldots, S_K$ from the main sensor array 12 that contributed radar data to generate the main beam MB. Accordingly, some sensors from the main sensor array 12 are used to generate the main beam MB and an auxiliary beam AB produced by the virtual auxiliary sensor array as described further below. Therefore, there is no loss in azimuthal resolution for the range-doppler-azimuth data that is produced by the noise suppression system 10. Accordingly, the detection performance for radar data produced by the noise suppression system 10 should be maintained for radar data which has high atmospheric interference and other spatial white noise. Furthermore, with the noise suppression system 10, there is no need for a physically separate auxiliary sensor array since the matched and mis-matched filters provide uncorrelated radar data. The construction of the virtual auxiliary sensor array is explained further below.

The noise suppression system 10 further comprises an adaptive beamformer 30 which is in communication with the beamformer 20 and the second processing module 22. The adaptive beamformer 30 receives the portion of matched beamformed range-doppler-azimuth data B as well as the portion of mismatched range-doppler-sensor data Y. From these inputs, the adaptive beamformer 30 generates an adaptive weight vector $W=[W_1 W_2 \ldots W_L]$ which is applied to the portion of mis-matched range-doppler-sensor data Y to generate an estimate I of the portion of matched range-doppler-azimuth data B. The estimate I is calculated for the same range, doppler and azimuth cells from which the portion of matched beamformed range-doppler-azimuth data B was taken. Accordingly, the adaptive beamformer 30 produces an auxiliary beam AB for which the mis-matched range-doppler-sensor data is tuned (see FIG. 4b which shows an example of a virtual auxiliary sensor array having 3 sensors).

The adaptive weight vector W is generated so that the difference between the portion of beamformed matched range-doppler-azimuth data B and the estimate I is minimized. Since the portion of beamformed matched range-doppler-azimuth data B contains possible radar target returns along with self-generated interference and external interference while the estimate I only contains external interference, the difference between the portion of radar data B and the estimate I will be minimized when the adaptive weight vector W is chosen such that the external interference in the estimate I approximates the external interference in the portion of radar data B. Accordingly, the estimate I is considered to be an estimate of the external interference in the portion of beamformed matched range-doppler-azimuth data B. Therefore, for a given azimuth θ, the adaptive beamformer 30 tunes the auxiliary beam AB so that the external interference in the auxiliary beam AB approximates the external interference in the main beam MB (see FIG. 4c). If the auxiliary beam AB is directed towards the target and contains target energy then the target itself may be suppressed. However, this situation is avoided by mis-match filtering the auxiliary sensor data as previously described.

The noise suppression system 10 further comprises a suppressor 32 that is in communication with the beamformer 20 and the adaptive beamformer 30 to receive the portion of radar data B and the external interference estimate I. The suppressor 32 removes the external interference estimate I from the portion of beamformed matched range-doppler-azimuth data B to produce a portion of noise suppressed beamformed matched range-doppler-azimuth data $B_r$. The noise suppressed portion of radar data $B_r$ is used to construct noise suppressed radar data which may then be processed by the proceeding components of a conventional radar system such as a detection module and a tracker.

The noise suppression system 10 may further comprise a storage means 33 that is in communication with the suppressor 32. The storage means 33 receives the noise suppressed portion of radar data $B_R$ and stores this data in an appropriate manner such that noise suppressed radar data may be retrieved to generate a noise reduced range-doppler plot for a given azimuth. The storage means 33 may be any suitable storage device such as a database, a hard-drive, a CD-Rom and the like.

A technique based on Wiener theory is preferably employed to choose the adaptive weight vector W such that the external interference estimate I approximates the external interference in the portion of beamformed matched range-doppler-azimuth data B. Accordingly, the auxiliary beam AB is calculated for the virtual auxiliary sensor array such that the difference between the external interference estimate I and the portion of radar data B is minimized in a mean-square error (MSE) sense.

The formulation of the adaptive weight vector W based on Wiener theory is as follows. The portion of mis-matched range-doppler-sensor data at a snap shot n (i.e. an observation in time) is represented by Y(n) and the portion of beamformed matched range-doppler-azimuth data at snap shot n is represented by B(n). The output of the adaptive beamformer 30 at snap shot n is given by equation 1:

$$\hat{I}(n|Y(n)) = W^H Y(n) \quad (1)$$

where $\hat{I}(n|Y(n))$ denotes the external interference estimate I(n) given the snapshot of radar data Y(n) and H denotes the Hermitian operator which is the complex conjugate transpose of a matrix. As mentioned previously, it is desired to have the interference estimate $\hat{I}(n|Y(n))$ approximate B(n). The error in estimating $\hat{I}(n|Y(n))$ is therefore given by equation 2.

$$e(n) = B(n) - W^H Y(n) \quad (2)$$

Accordingly, the mean square error J(W) is given by equation 3.

$$J_n(W) = E[e(n)e^*(n)] = E[B(n)B^*(n)] - W^H E[Y(n)B^*(n)] - \quad (3)$$
$$E[B(n)Y^H(n)]W + W^H E[Y(n)Y^H(n)]W$$

Assuming that the portion of beamformed matched range-doppler-azimuth data B(n) and the portion of mis-matched range-doppler-sensor data Y(n) for a given snap shot n are jointly stationary, then equation 3 may be simplified to equation 4.

$$J_n(W) = \sigma_d^2(n) - p(n)^H W - W^H p(n) + W^H R(n) W \quad (4)$$

where $\sigma_d^2(n)$ is the variance of B(n) assuming it has zero mean and p(n) is the expectation $E[Y(n)^H \cdot B(n)]$ which is a vector resulting from the cross-correlation of the portion of mis-matched range-doppler-sensor data Y(n) and the portion of beamformed matched range-doppler-azimuth data B(n). The symbol R(n) denotes the expectation $E[Y^H(n) \cdot Y(n)]$ which is the autocorrelation matrix of the portion of mis-matched range-doppler-sensor data Y(n). The cross-correlation p(n) indicates the degree of similarity between the portion of beamformed matched range-doppler-azimuth data B(n) and the portion of mis-matched range-doppler-sensor data Y(n) while the autocorrelation R(n) indicates the degree of similarity between the data of the virtual auxiliary sensor array.

The mean square error function $J_n(W)$ is a second order function of the adaptive weight vector W assuming that the portion of mis-matched range-doppler-sensor data Y(n) and the portion of beamformed matched range-doppler-azimuth data B(n) are jointly stationary. The goal is to minimize the mean square error function $J_n(W)$ by selecting an optimum adaptive weight vector $W_0$. Accordingly, as is well known to those skilled in the art, the mean-square error $J_n(W)$ is differentiated with respect to the adaptive weight vector W and the derivative is set equal to zero as shown in equation 5.

$$\frac{dJ_n(W)}{dW} = -2p(n) + 2R(n)W = 0 \quad (5)$$

The solution of equation 5 yields the optimum set of adaptive weights $W_{0,n}$ which is given by equation 6.

$$R(n)W_{0,n} = p(n) \Rightarrow W_{0,n} = R(n)^{-1} p(n) \quad (6)$$

To implement the noise suppression system 10, an estimate of the autocorrelation matrix R(n) and the cross-correlation vector p(n) is required. The expected value operator E[ ] that is used in the calculation of R(n) and p(n) may replaced with the averaging operator as is commonly known to those skilled in the art. However, the averaging should be carried out over a portion of data in which the maximum amount of external interference exists. Furthermore, R(n) and p(n) must be estimated in a way that the energy of possible targets in the radar data plays an insignificant role. This is necessary since both the main sensor array 12 and the virtual auxiliary sensor array share the same sensors.

Figure 5:
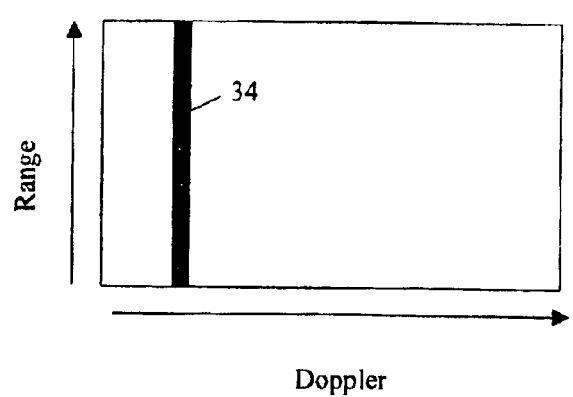
FIG. 5 is a range-doppler plot illustrating the shape of a region over which correlation-based calculations are preferably done for external interference estimation.
Figure 11A:
FIG. 11a is range-doppler plot of an example of radar data containing co-channel interference and simulated targets in which the noise suppression method of the present invention is not used.

Referring to FIG. 11a, co-channel interference exists throughout the range space for specific doppler frequencies as can be seen by the ridges occurring at doppler frequencies between −2 and −4 Hz. Conversely, referring to FIG. 12a, impulsive noise is spread throughout the entire range-doppler space. A good estimate of external interference comprising both co-channel interference and impulsive noise may be obtained by averaging range-doppler data over areas having a significant overlap with both co-channel interference and impulsive noise. In other words, the shape of the region over which averaging is performed is preferably selected such that it includes most of the interference. This amounts to averaging the range-doppler data along the range-dimension for a given doppler frequency as represented by the strip 34 shown in FIG. 5. Alternatively, this strip 34 may be another shape (this is dictated by the shape of the interference). Accordingly, the cross-correlation vector p(n) at snap shot n can be estimated along the range dimension for a given doppler frequency $D_i$ according to equation 7:

$$\hat{p}(n, D_i) = \frac{1}{N} \sum_{r=1}^{N} Y^*(n, r, D_i) B(n, r, D_i) \qquad (7)$$

where r represents range index and N is the number of range cells in the averaging process. Similarly, the autocorrelation matrix R(n) at snap shot n can be estimated along the range dimension for a given doppler frequency $D_i$ according to equation 8.

$$\hat{R}(n, D_i) = \frac{1}{N} \sum_{r=1}^{N} Y^*(n, r, D_i) Y(n, r, D_i) \qquad (8)$$

To simplify the rest of the description, the snap shot index (n) will be discarded.

Figure 6:
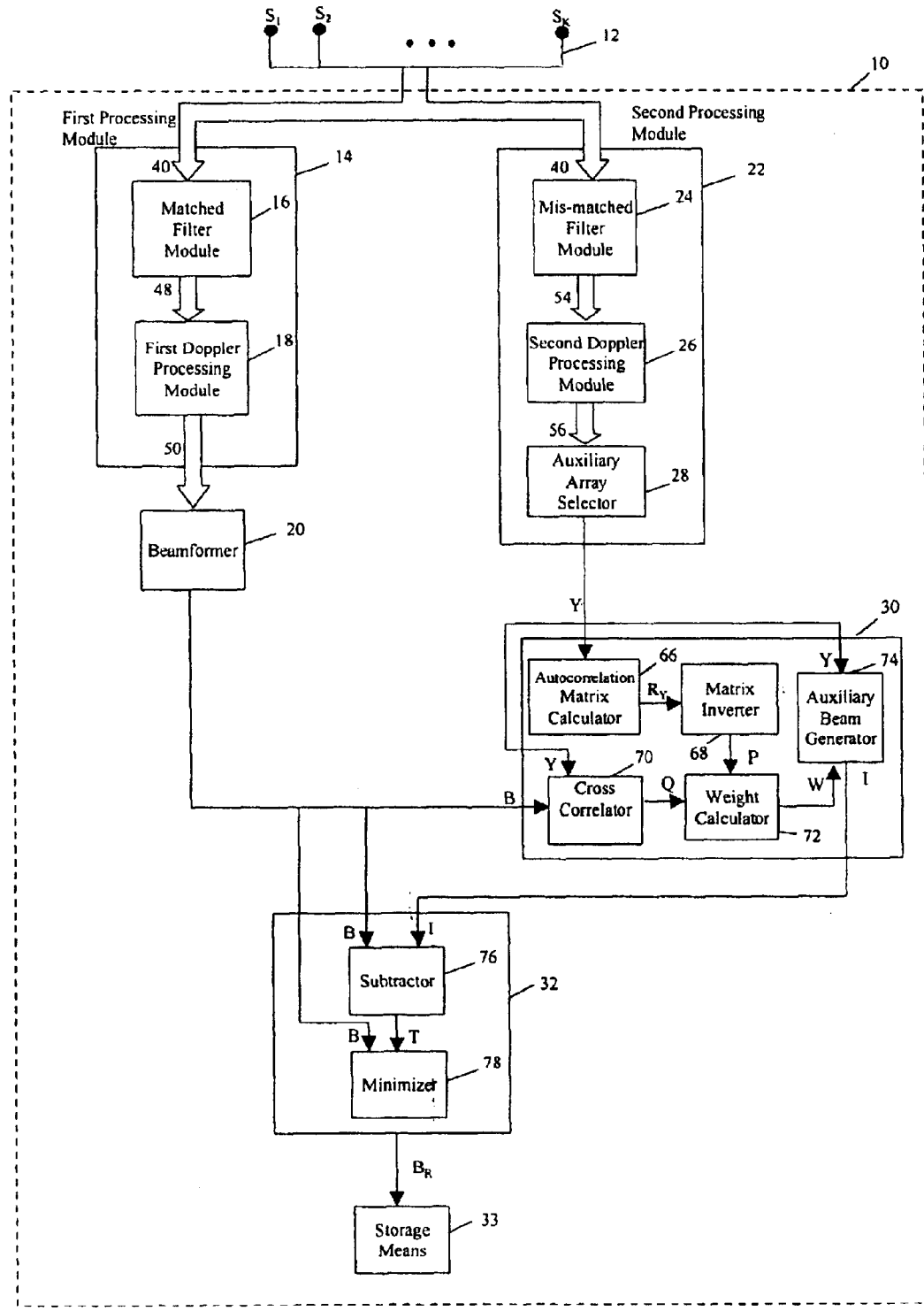
FIG. 6 is a more detailed embodiment of the noise suppression system in accordance with the present invention.

Referring now to FIG. 6, shown therein is a more detailed implementation of the noise suppression system 10 of the present invention. Reference will also be made to FIG. 7 which shows the radar data at various nodes in the noise suppression system 10 to facilitate explaining the operation of the system 10 in accordance with the present invention. The main sensor array 12 provides radar data that can be thought of as a three dimensional matrix of range-pulse-sensor data (represented by the thick block lines in FIG. 6). The radar data recorded by the main sensor array 12 has preferably been calibrated to correct for known phase and amplitude errors in each sensor. Calibration is preferably done by having a transmitter moved to various known locations in the surveillance area and transmitting EM pulses which are recorded by the main sensor array 12. The locations of the transmitter is then derived from the recorded radar data and compared with the known locations of the transmitter to provide a weight vector that is used to calibrate the data recorded by the main sensor array. Weight vectors may be generated for various transmission frequencies. These weight vectors should not be confused with the adaptive weight vector W.

Figure 7A:
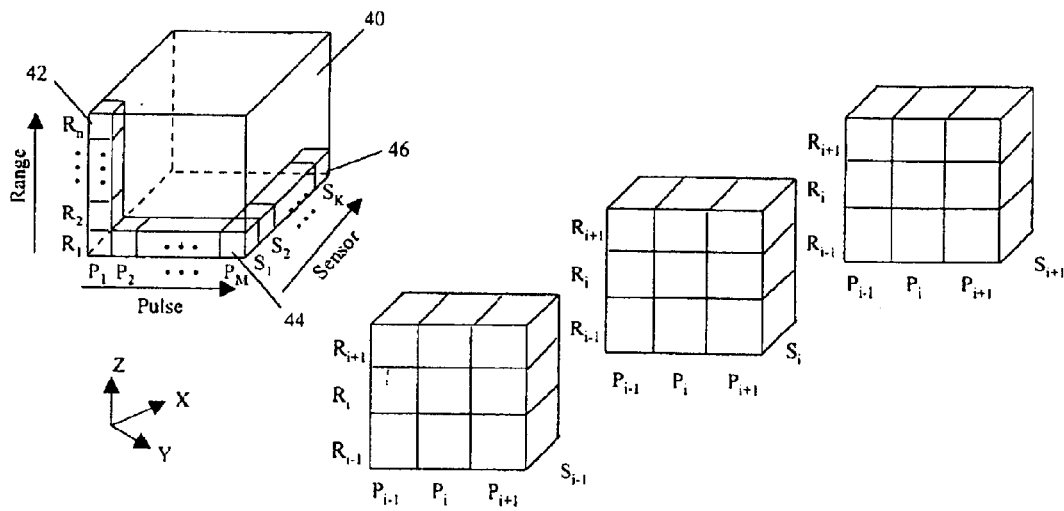
FIGS. 7a to 7h illustrate the radar data at various nodes in the noise suppression system of FIG. 6.

The organization of the range-pulse-sensor data is shown in FIG. 7a as a three-dimensional data cube 40 with the range dimension extending along the z axis, the pulse dimension extending along the y axis and the sensor dimension extending along the x axis according to the x-y-z coordinate system shown in FIG. 7a. Preferably, the radar data is segmented into time segments in accordance with a CIT. The CIT is different given different radar modes of operation such as ship mode in which ship targets are being monitored or air mode in which planes are being monitored. As mentioned previously, the radar data 40 has been subjected to the signal processing operations used for pre-processing as is commonly known to those skilled in the art. Accordingly, the modules which would perform these signal processing operations are not shown in the block diagram of FIG. 6.

Referring now to range vector 42, there are a series of range cells having range index values $R_1, R_2, \ldots, R_N$ containing the EM values that are recorded by sensor $S_1$ in response to the first transmitted EM pulse represented by pulse index $P_1$. The distance represented by a given range cell is calculated by recording the time at which the EM value for the range cell was sampled with respect to the time that the corresponding EM pulse was transmitted, multiplying that time by the speed of light and dividing by two. Referring to pulse vector 44, there are a series of pulse cells having pulse index values $P_1, P_2, \ldots, P_M$, containing EM values that were recorded by sensor $S_1$ at the range value of the range index value $R_1$ for each pulse that was transmitted in the CIT. Accordingly, the pulse index $P_1$ represents the first pulse that was transmitted, the pulse index $P_2$ represents the second pulse that was transmitted, etc. The sampled EM values within the pulse vector 44 were all sampled at the same time after each EM pulse was transmitted (hence they all correspond to the range value represented by range index $R_1$). Referring now to sensor vector 46, there are a series of EM values that are measured by each sensor $S_1, S_2, \ldots, S_K$, at the range value of range index $R_1$ after the transmission of the EM pulse represented by pulse index $P_M$. Accordingly, each of the EM values contained within the sensor vector 46 were sampled at the same time (hence the same range index $R_1$) after the same pulse (hence the same pulse index $P_M$). FIG. 7a also shows portions of range-pulse two-dimensional data for a given sensor to show how the radar data 40 is organized. As is evident from FIG. 7a, there are a plurality of range vectors 42, pulse vectors 44 and sensor vectors 46 that make up the range-pulse-sensor radar data 40.

The range-pulse-sensor data 40 is provided to the matched filter module 16 which match filters the data 40 to provide matched range-pulse-sensor data 48. The matched filter module 16 is preferably a digital filter with a transfer function that is matched to the transmitted EM pulses. The matched filter module 16 may comprise a single digital filter that operates along the range dimension for a given pulse index $P_i$ and a given sensor $S_i$ (i.e. the matched filter operates on a range vector 42 from the range-pulse-sensor data 40). This matched filtering operation is performed for each pulse index $P_i$ and each sensor $S_i$. The match filtering may be done in a sequential manner such that the transfer function of the matched filter is changed depending on the pulse return being processed (i.e. matched to the EM pulse that evoked the current pulse return). Alternatively, the matched filter module 16 may comprise a bank of digital filters, each having a transfer function matched to one of the transmitted EM pulses. The system would then switch the incoming pulse returns to the corresponding matched filter.

The transmitted EM pulses are preferably designed utilizing Frank codes to combat range wrap (Frank R. L., IEEE Trans. On IT, Vol. 9, pp. 43–45, 1963). Accordingly, Frank codes are also used to generate the filter coefficients for the matched filter module 16. Frank codes are well known to those skilled in the art. Frank codes are used to phase modulate each generated EM pulse. Accordingly, a given EM pulse is divided into subpulses which each have a phase in accordance with a Frank code. The generated EM pulses are all orthogonal to each other since the rows of a Frank code matrix are orthogonal. Frank codes are generated from the Frank code matrix. An example of a P4 Frank matrix is P4=[1 1 1 1; 1 j–1 j; 1–1 1–1; 1–j–1 j] where the rows of the matrix are separated by a semicolon. Accordingly an EM pulse based on the fourth row of the Frank P4 matrix, for example, would have four sinusoidal sub-pulses having phases of 0°, 270°, 180° and 90° respectively. Furthermore, the coefficients of a matched filter that is matched to this EM pulse would have the same samples as the generated EM pulse that are conjugated and reversed in order. This may be repeated for each row of the Frank P4 matrix so that there would be 4 distinct EM pulses and 4 distinct matched filters. Accordingly, the transmission of these four distinct EM pulses would be repeatedly transmitted in a sequential fashion such as EM1, EM2, EM3 and EM4 (where the number is a row in the P4 matrix). The radar returns are then processed by the corresponding matched filter.

Other Frank codes based on a P8, P16 or a P32 matrix may also be used. However, in the case of a P32 matrix, the phases required for phase modulation would need to be precisely generated since they are closer together and this requires more expensive hardware. Other codes, such as Barker codes, may be used given different requirements for the bandwidth of the generated EM pulses.

Figure 7B:
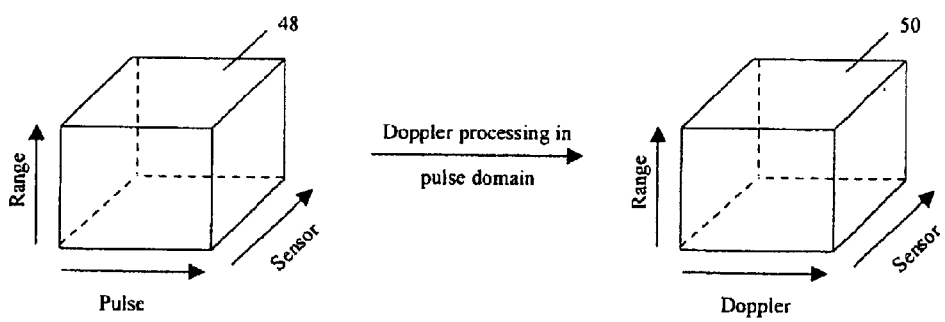

The matched range-pulse-sensor data 48 is then provided to the first doppler processing module 18 which processes the data to provide matched range-doppler-sensor data 50. The first doppler processing module 18 performs doppler processing along the pulse dimension (or pulse domain) of the matched range-pulse-sensor data to provide the matched range-doppler-sensor data 50. Doppler processing preferably includes performing an FFT with an appropriate window function on each pulse vector 44 to convert the time series data for each range index value $R_i$ to a frequency series. FIG. 7b illustrates the conversion of the matched range-pulse-sensor data 40 into the matched range-doppler-sensor data 50. Alternatively, instead of using the FFT to implement doppler processing, a bank of comb filters may be used as is commonly known to those skilled in the art.

Figure 7C:
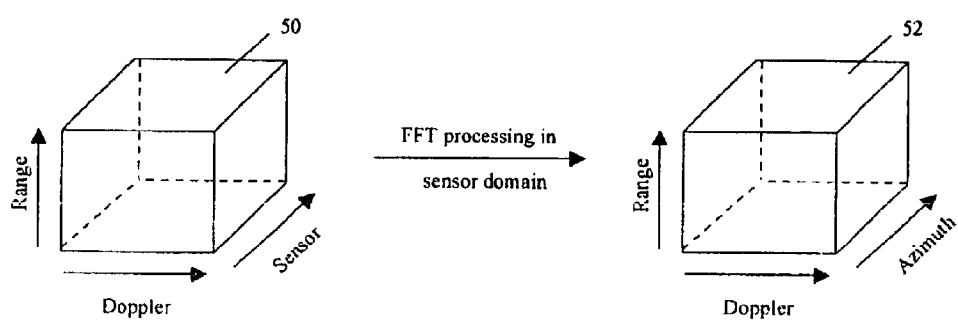

The matched range-doppler-sensor data 50 is then provided to the beamformer 20 which generates beamformed matched range-doppler-azimuth data 52. Referring to FIG. 7c, the beamformer 20 performs a series of FFT operations along the sensor dimension to convert the sensor data from the spatial domain to the angular or azimuth domain. Accordingly, an FFT is performed on each sensor vector 46 to produce the matched range-doppler-azimuth data 52. The beamformer 20 also provides a portion B of the beamformed matched range-doppler-azimuth data 52 for further processing as will be further described below.

The range-pulse-sensor data 40 is also provided to the mis-matched filter module 24 which "mis-match" filters the radar data 40 to provide mis-matched range-pulse-sensor data 54. The mis-matched filter module 24 is preferably a digital filter with a transfer function that is mis-matched to the transmitted EM pulses. The mis-matched filter module 24 may be implemented and operated on the range-pulse-sensor data 40 in the same fashion as the matched filter module 16 to produce the mis-matched range-pulse-sensor radar data 54. However, in this case the mis-matched filter uses a transfer function that rejects the transmitted EM pulse. Accordingly, using the example given above for the matched filter module 16, if the transmitted EM pulse was generated based on the fourth row of the Frank P4 matrix, then the phases of the sinusoidal sub-pulses would be obtained from any of the rows of the Frank P4 matrix other than the fourth row and reversed in order to obtain the coefficients of the mis-matched filter module 24. Accordingly, since the rows of the P4 matrix are sequentially used to repeatedly provide a series of EM pulses then a series of mis-matched filters would be needed in the mis-matched filter module 24 to process the returns of each of these EM pulses such that the mis-matched filter output is uncorrelated of the matched filter output produced by the matched filter module 16.

The mis-matched range-pulse-sensor data 54 is then provided to the second doppler processing module 26 which processes the data to produce mis-matched range-doppler-sensor data 56. The second doppler processing module 26 is implemented in a similar fashion to the first doppler processing module 18 and will not be further discussed.

Figure 7D:
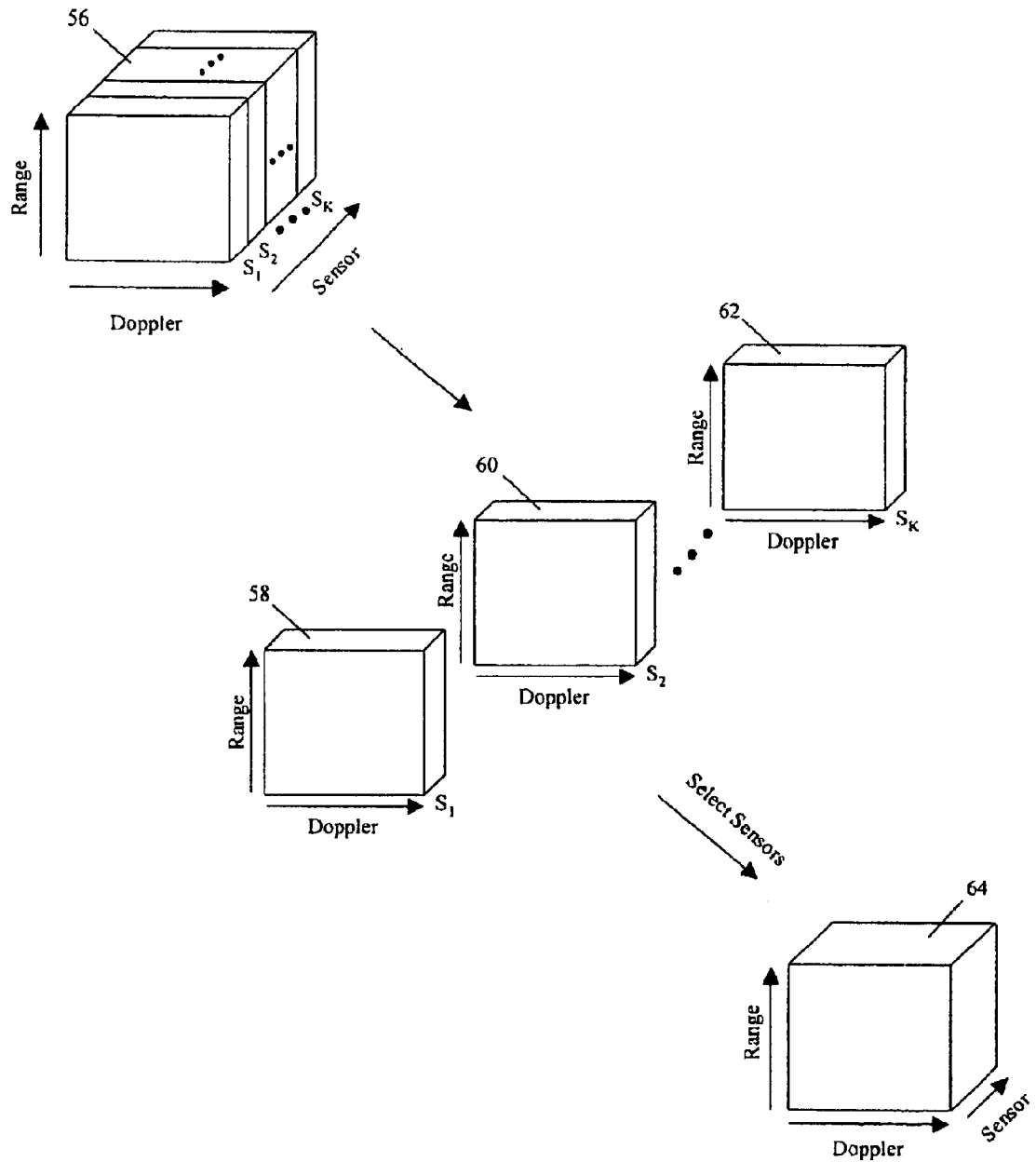

The second processing module 22 further comprises the auxiliary array selector 28 which provides mis-matched range-doppler data for the virtual auxiliary sensor array. Referring to FIG. 7d, this corresponds to taking the mis-matched range-doppler-sensor data 56, dividing the data 56 into two-dimensional slices 58, 60, . . . , 62, where each slice corresponds to range-doppler data for sensors $S_1, S_2, \ldots, S_K$ of the main sensor array 12, and selecting a subset of these slices which are then concatenated to form mis-matched range-doppler-sensor data 64. The array of sensors contributing to the data 64 are referred to as the virtual auxiliary sensor array having sensors $A_1, A_2, \ldots, A_L$ (not shown). The auxiliary array selector 28 further provides a portion Y of the mis-matched range-doppler sensor data 64 for further processing as further described below.

As previously mentioned, the virtual auxiliary sensor array may comprise a subset of the sensors from the main sensor array 12 that are used to provide radar data used to construct the main beam MB or comprise each sensor from the main sensor array 12 that are used to provide radar data used to construct the main beam MB (the radar data has been pre-processed and calibrated). If the virtual auxiliary sensor array comprises a subset of the main sensor array 12 then two conditions should preferably be satisfied. The first condition is that the aperture size of the virtual auxiliary sensor array should be the same as the aperture size of the main sensor array 12. This means that the leftmost and rightmost spatially oriented sensors in the main sensor array 12 that provide radar data for the main beam MB should also be the leftmost and rightmost spatially oriented sensors in the virtual auxiliary sensor array. The second condition is that the zero phase center of the virtual auxiliary sensor array should preferably be far removed from the zero phase center of the main sensor array 12. This is an attempt to minimize the overlap of the main beam MB and the auxiliary beam AB in order to reduce the probability of missing a target if the auxiliary beam AB is directed towards a target's direction of arrival. The zero phase center of a sensor array corresponds to the centroid of the sensor array given the spatial distribution of the sensors in the sensor array.

The zero phase center for the main sensor array 12, which is a linear array if all sensors are operational, occurs at the middle of the main sensor array 12 (i.e. (1+2+3+4+5+6+7+8)/8=4.5 where each sensor is represented by its order in the main sensor array 12). However, since the sensors in the virtual auxiliary sensor array may not be evenly spatially distributed, the zero phase center of the virtual auxiliary sensor array is shifted towards the end of the virtual auxiliary sensor array having the greater density of sensors. To satisfy the second criterion, the auxiliary array selector 28 may calculate the centroids of all virtual auxiliary arrays which have a pre-specified number of sensors (according to the example shown above). The sensors in the virtual auxiliary array that satisfies both the first and second criterions is then selected by the auxiliary array selector 28. Given, a fixed main sensor array 12, the operation just mentioned may be performed using a varying number of sensors for the virtual auxiliary sensor array so that the virtual auxiliary sensor array may be predetermined before the operation of the noise suppression system 10. Accordingly, during the operation of the noise suppression system 10, the sensors in the virtual auxiliary sensor array may be supplied by a look-up table given a desired number of sensors in the virtual auxiliary sensor array. The look-up table indicates the position of each auxiliary array sensor $A_i$ in the main sensor array 12.

Although the block diagram in FIG. 6 shows that the auxiliary array selector 28 is connected between the second doppler processing module 26 and the adaptive beamformer 30, the position of the auxiliary array selector 28 may be changed for more efficient signal processing. For instance, the auxiliary array selector 28 may be placed between the mis-matched filter module 24 and the second doppler processing module 26. Alternatively, the auxiliary array selector 28 may be located before the mis-matched filter module 24.

The noise suppression system 10 further comprises the adaptive beamformer 30 which is in communication with the second processing module 22 and the beamformer 20. The adaptive beamformer 30 comprises an autocorrelation matrix calculator 66, a matrix inverter 68, a cross correlator 70, a weight calculator 72 and an auxiliary beam generator 74 connected as shown in FIG. 6.

Figure 7E:
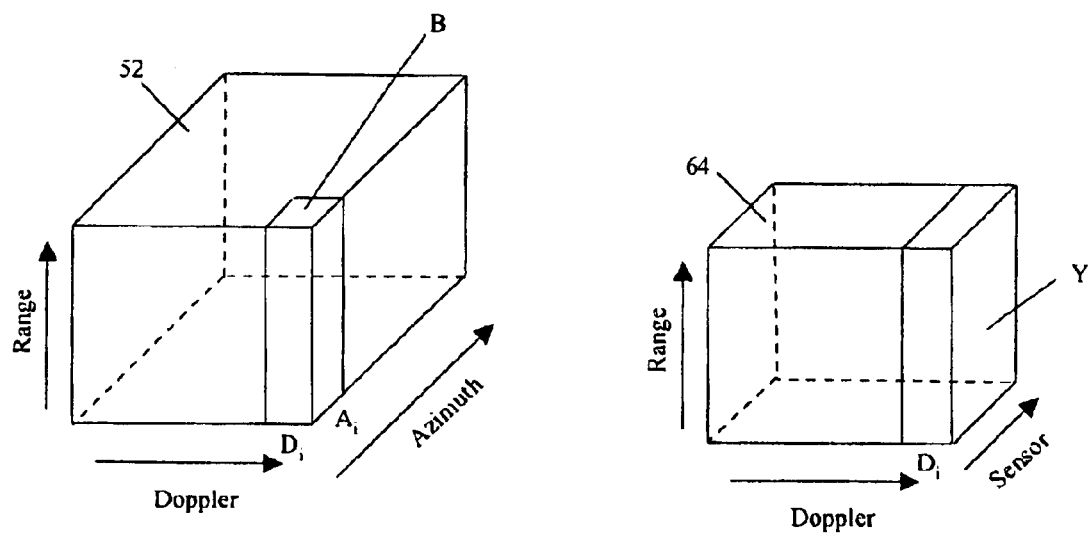

The autocorrelation matrix calculator 66 receives the portion of the mis-matched range-doppler-sensor data Y from the virtual auxiliary sensor array and generates the autocorrelation matrix $R_Y$ according to equation 8 (i.e. $R_Y=Y^H \cdot Y$). Referring to FIG. 7e, the portion of radar data Y corresponds to a two-dimensional slice of range-sensor data for a given doppler index $D_i$. Therefore, the portion of radar data Y is a matrix having a dimension of N-by-L (i.e. N range cells and L sensors). Accordingly, the autocorrelation matrix calculator 66 generates the autocorrelation matrix $R_Y$ by performing matrix multiplication between the matrix Y and the matrix $Y^H$. The dimension of the autocorrelation matrix $R_Y$ is L-by-L (i.e. L rows and L columns).

The matrix inverter 68 receives the autocorrelation matrix $R_Y$ and performs matrix inversion to obtain the inverse autocorrelation matrix $P=R_Y^{-1}$ using any inversion means commonly known to those skilled in the art. In the event that the portion of radar data Y does not contain much noise, the autocorrelation matrix $R_Y$ may be rank deficient. This may be determined by calculating the condition number of the autocorrelation matrix $R_Y$. In this situation, the pseudo-inverse operator is employed to obtain the inverse autocorrelation matrix P. The dimension of the inverse autocorrelation matrix P is L-by-L. The equations needed for obtaining the condition number and the pseudo-inverse of $R_Y$ are well known to those skilled in the art.

The cross-correlator 70 receives the portion of mis-matched range-doppler-sensor data Y from the virtual auxiliary sensor array as well as the portion of beamformed matched range-doppler-azimuth data B from the main sensor array 12 and calculates the cross-correlation vector Q as given by equation 7 (i.e. $P=Y^H \cdot B$). Referring again to FIG. 7e, the portion of radar data B is a range vector for a given azimuth index $A_i$ and the same doppler index $D_i$ corresponding to the portion of data Y. The portion of data B has a dimension of N-by-1. The cross-correlator 70 performs matrix multiplication to generate the cross-correlation vector Q having a dimension of L-by-1 (i.e. L-by-N*N-by-1= L-by-1).

The weight calculator 72 receives the cross-correlation vector Q and the inverse autocorrelation matrix P and produces the adaptive weight vector W by performing matrix multiplication according to equation 6. Accordingly, the adaptive weight vector W is a row vector having a dimension of L-by-1. The auxiliary beam generator 74 receives the adaptive weight vector W and the portion of radar data Y to generate an estimate of the interference I in the portion of radar data B according to equation 9.

$$I=W^H \cdot Y \qquad (9)$$

Accordingly, the interference estimate I is a vector having a dimension of N-by-1.

The noise suppression system 10 further comprises the suppressor 32 which includes a subtractor 76 and a minimizer 78 in communication with the subtractor 76. The subtractor 76 receives the portion of radar data B and the external interference estimate I and provides a vector or subtraction signal T according to equation 10 (i.e. part-wise subtraction in the vectors B and I).

$$T=B-I \qquad (10)$$

Figure 7F:
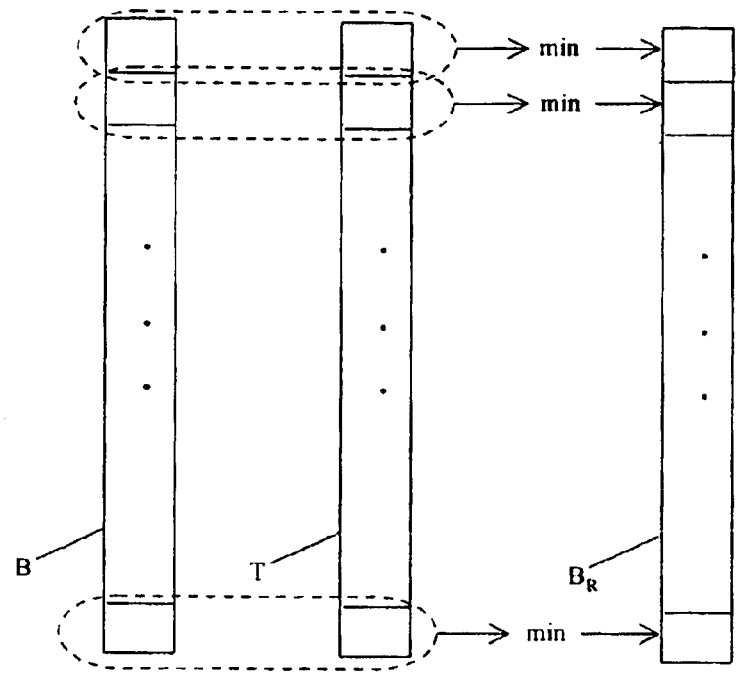

The minimizer 78 receives the vector T and the portion of radar data B and generates a portion of noise suppressed beamformed matched range-doppler-azimuth data $B_R$ according to equation 11:

$$B_R=\min(B,T) \qquad (11)$$

where the operator min( ) is defined by the process of lining up the two vectors B and T, taking a value from a cell in the vector B, taking a value from the same cell in the vector T and placing the minimum of these two values in the same cell in the vector $B_R$ as shown in FIG. 7f. This operation is repeated for all cells in the vectors B and T.

Figure 7G:
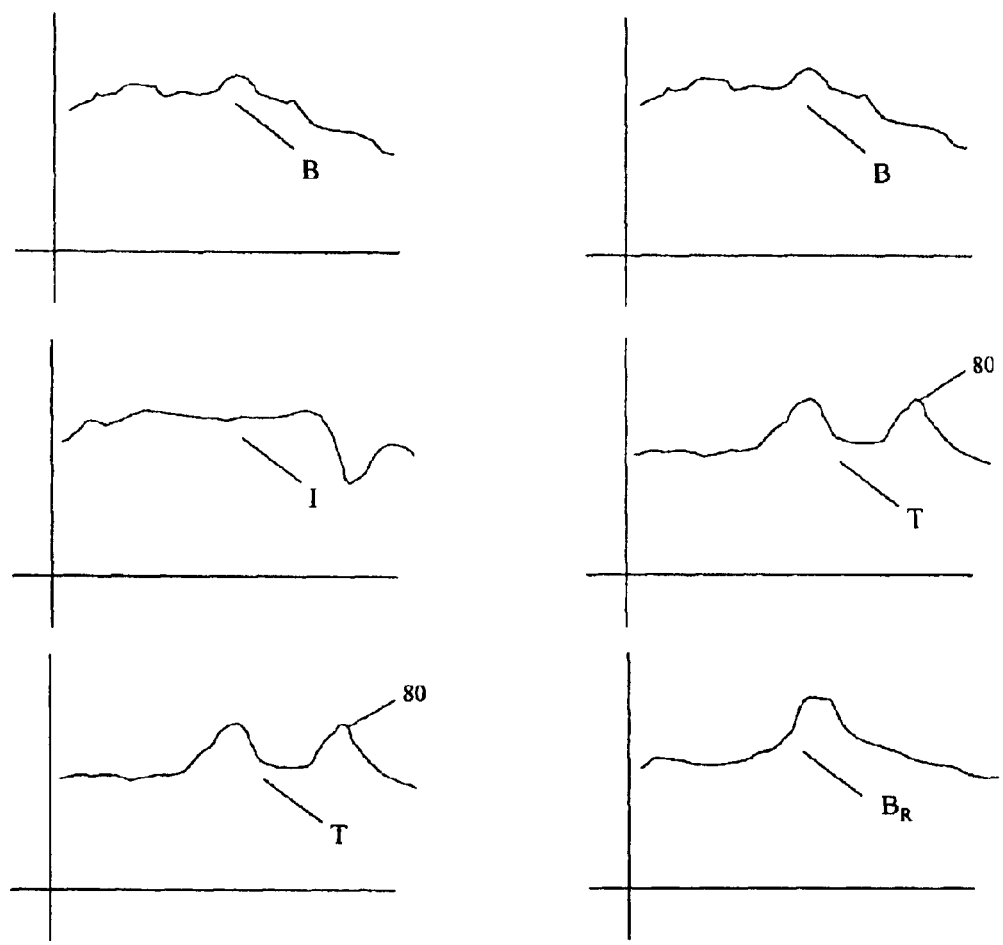

Referring now to FIG. 7g, shown therein are a series of vectors (which may also be referred to as data series or signals) which assist in explaining the function of the suppressor 32. For a given portion of radar data B and an external interference estimate I, the vector T is generated by element-wise vector subtraction. However, there is the possibility of extraneous noise 80 occurring in the external interference estimate I. The extraneous noise 80, which results from the operation of the mis-matched filter module 24, is also contained within the vector T. Accordingly, the vector T cannot be directly used as the portion of noise suppressed beamformed matched range-doppler-azimuth data $B_R$. Rather, the vector T and the portion of radar data B are processed by the minimizer 78 which lines up the two vectors B and T and selects the minimum of these two vectors when constructing the vector $B_R$ as previously discussed. Consequently, if there is any extraneous noise 80 within the external interference estimate I then the minimizer 78 will remove it.

Figure 7H:
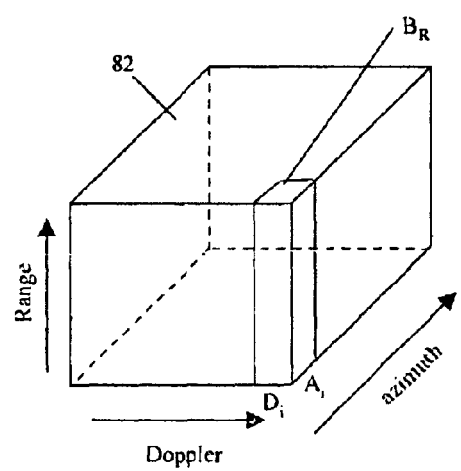

Referring now to FIG. 7h, the vector $B_R$ is used to construct the noise suppressed beamformed matched range-doppler-azimuth data 82. The position of the vector $B_R$ within the noise suppressed radar data 82 is the same as the position of the vector B within the radar data 52 shown in FIG. 7e. Accordingly, the noise suppressed radar data 82 is built up one range vector at a time and stored accordingly in storage means 33. In this fashion, for a given doppler index, the portion of data B may be obtained for a given azimuth index and the external interference estimate I calculated for that same azimuth index and doppler index to provide a portion of noise suppressed data $B_R$ as discussed above. This operation is then repeated along the azimuth dimension (i.e. for each azimuth index) for the chosen doppler index until all of the azimuth indices have been processed. The doppler index is then shifted by one position and this operation is repeated along the azimuth dimension once more. This operation is then repeated along the doppler dimension until the noise suppressed radar data 82 is constructed. Alternatively, the noise suppressed radar data 82 may be constructed by selecting an azimuth index and then moving along the doppler dimension. Once the operation has been performed for all of the doppler indices, the azimuth index is shifted by one position and the operation is performed once more along the doppler dimension. This is then repeated along the azimuth dimension until the noise suppressed radar data 82 is constructed.

The elements of the noise suppression system 10 shown in FIG. 6 may be implemented by any means known in the art although the use of dedicated hardware such as a digital signal processor may be preferable. Alternatively, discrete components such as filters, comparators, multipliers, shift registers, memory and the like may also be used. Furthermore, certain components of the noise suppression system 10 may be implemented by the same structure. For instance, the first doppler processing module 18 and the second doppler processing module 26 may be implemented by the same hardware structure.

Alternatively, the elements of this invention may preferably be implemented via a computer program which may be written in Matlab, C, C++, Labview™ or any other suitable programming language embodied in a computer readable medium on a computing platform having an operating system and the associated hardware and software that is necessary to implement the noise suppression system 10. The computer program may comprise computer instructions that are adapted to perform the steps of a noise suppression method (described further below) which is in accordance with the noise suppression system 10. The computer programs may comprise modules or classes, as is known in object oriented programming, that are implemented and structured according to the structure of the noise suppression system 10. Accordingly, separate software modules may be designed for each component of the noise suppression system 10. Alternatively, the functionality of these components may be combined into a smaller number of software modules where appropriate.

Figure 8:
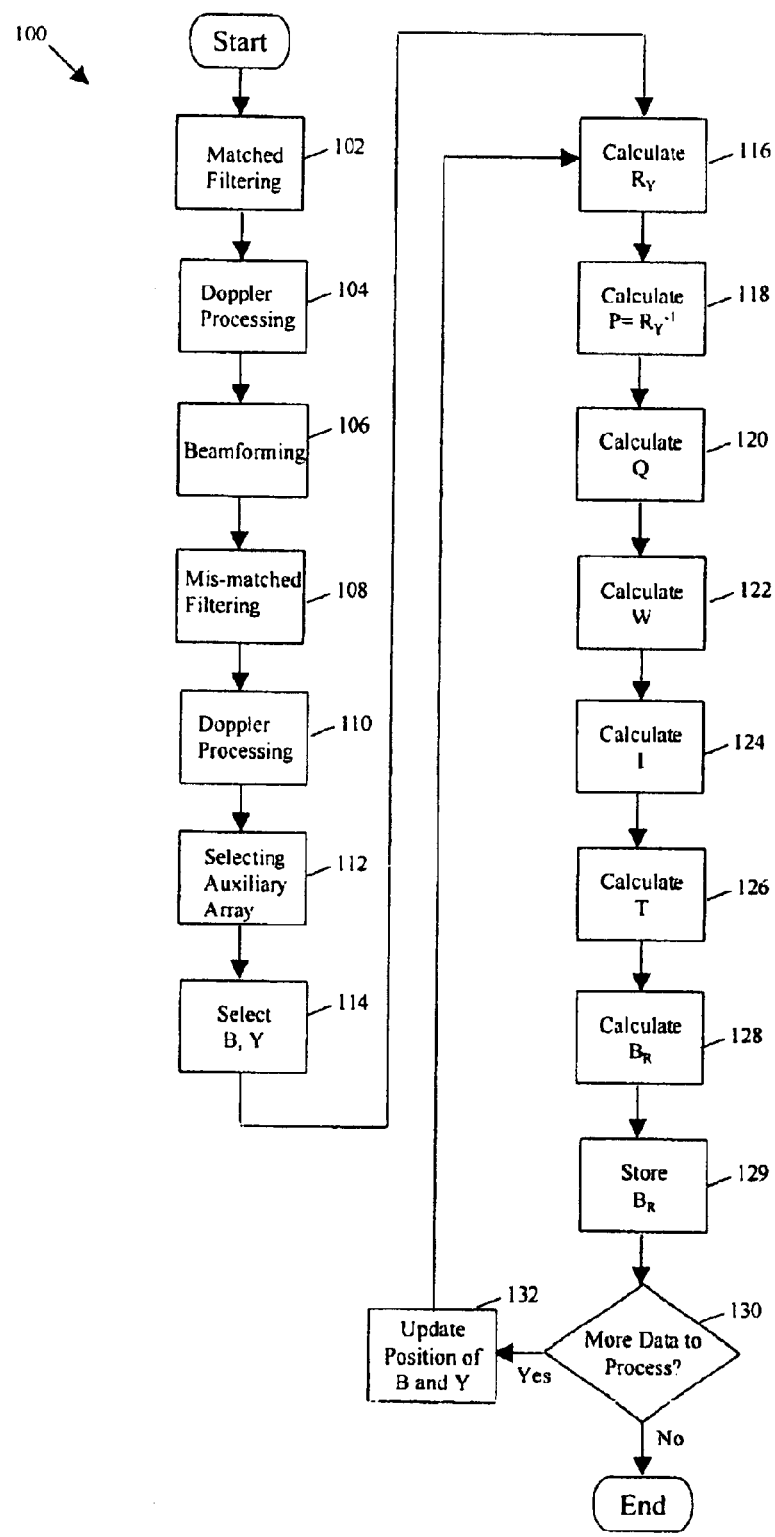
FIG. 8 is a flowchart of a noise suppression method in accordance with the noise suppression system of FIG. 6.

Referring now to FIG. 8, shown therein is a noise suppression method 100 for suppressing noise in radar data in accordance with the present invention. Preferably the radar data has been sampled by the main sensor array 12 for a length of time in accordance with a CIT and has been pre-processed and calibrated as previously mentioned. The noise suppression method 100 begins at step 102 where the pre-processed range-pulse-sensor radar data from the main sensor array 12 is matched filtered as explained above. The next step 104 is to perform doppler processing on the match filtered range-pulse-sensor data to provide matched range-doppler-sensor data. As mentioned previously, doppler processing may comprise performing an FFT with an appropriate window function or utilizing filter bank processing as is commonly known to those skilled in the art. The next step 106 consists of beamforming the matched range-doppler-sensor data to provide beamformed matched range-doppler-azimuth data.

At step 108, mis-matched filtering is performed on the range-pulse-sensor data from the main sensor array 12. The next step 110 is to perform doppler processing on the mis-matched filtered range-pulse-sensor data to provide mis-matched range-doppler-sensor data. The next step 112 is to select a virtual auxiliary sensor array given the sensors from the main sensor array 12 that are used to produce the main beam MB. Accordingly, steps 108 to 112 may be summarized as providing mis-matched range-doppler-sensor data for the virtual auxiliary sensor array given the range-pulse-sensor data obtained from the main sensor array. As mentioned previously, the selection of the virtual auxiliary array may occur before the doppler processing step 110 or the mis-matched filtering step 108 for more efficient signal processing.

At step 114, portions of radar data B and Y are selected. The radar data B is selected from the beamformed matched range-doppler-azimuth data and is a range vector for a given doppler index and a given azimuth index. The radar data Y is selected from the mis-matched range-doppler-sensor data of the virtual auxiliary sensor array and is a two-dimensional slice of range-sensor data for the same doppler index of the radar data B.

The next series of steps 116 to 124 of the noise suppression method 100 perform adaptive beamforming on the portion of the mis-matched range-doppler-sensor data Y to provide an estimate I of the external interference in the portion of the beamforming matched range-doppler-azimuth data B. The adaptive beamforming starts at step 116 where the autocorrelation matrix $R_Y$ ($R_Y = Y^H \cdot Y$) of the radar data Y is calculated. At step 118, the inverse autocorrelation matrix P ($P = R_Y^{-1}$) is calculated. The noise suppression method 100 then moves to step 120 where the cross-correlation vector Q ($Q = Y^H \cdot B$) is calculated. The adaptive weight vector W is then calculated at step 122 based on the inverse autocorrelation matrix P and the cross-correlation vector Q ($W = P \cdot Q$). The estimate of external interference I ($I = W^H \cdot Y$) within the portion of beamformed matched range-doppler data B is then calculated at step 124.

The noise suppression method 100 then moves to steps 126 and 128 where the external interference estimate I and the portion of beamformed matched range-doppler-azimuth data B is used to obtain a portion of noise suppressed beamformed matched range-doppler-azimuth data $B_R$. At step 126, the external interference estimate I is subtracted from the portion of beamformed matched range-doppler-azimuth data B to form the vector or subtraction signal T. Next, at step 128, a given element in the portion of beamformed matched range-doppler-azimuth data B is compared to the element at the same location in the vector T and the minimum of these two elements is stored in the same location in the portion of noise suppressed beamformed matched range-doppler-azimuth data $B_R$. This is repeated for each element in the radar data B. The portion of noise suppressed beamformed matched range-doppler-azimuth data $B_R$ is then stored at step 129.

The next step 130 of the noise suppression method 100 is to determine if there is more radar data to process. If there is no more radar data to process then the noise suppression method 100 is finished. Otherwise, the next step 132 is to update the portion of beamformed matched range-doppler-azimuth data B and the portion of mis-matched range-doppler-sensor data Y from the auxiliary sensor array. The updating is performed as previously explained. Steps 116 to 130 are then repeated.

Under certain conditions, strong ionospheric noise may appear in the form of horizontal strips in the generated range-doppler data for a given azimuth value. This appears as interference in a number of range-doppler cells at a given range index. In this situation, it is preferable to avoid the radar data from these range-doppler cells in the calculation of the autocorrelation matrix $R_Y$ and the cross-correlation matrix Q since these contaminated range-doppler cells may harm the performance of the adaptive beamformer 30. One way to remove the contaminated data from the calculation is to utilize a median filter which calculates the median (M) for a range vector B' and generates a threshold value ($\lambda$) according to equation 12:

$$\lambda = v \cdot M \tag{12}$$

where v represents a constant value. The data in the range vector B' may then be median filtered according to equation 13.

$$OB(i) = B'(i) \text{ if } B'(i) < \lambda$$
$$OB(i) = 0 \text{ if } B'(i) > \lambda \tag{13}$$

Accordingly, all values in B' that are above the threshold value $\lambda$ are set to zero in the data portion OB.

Figure 9:
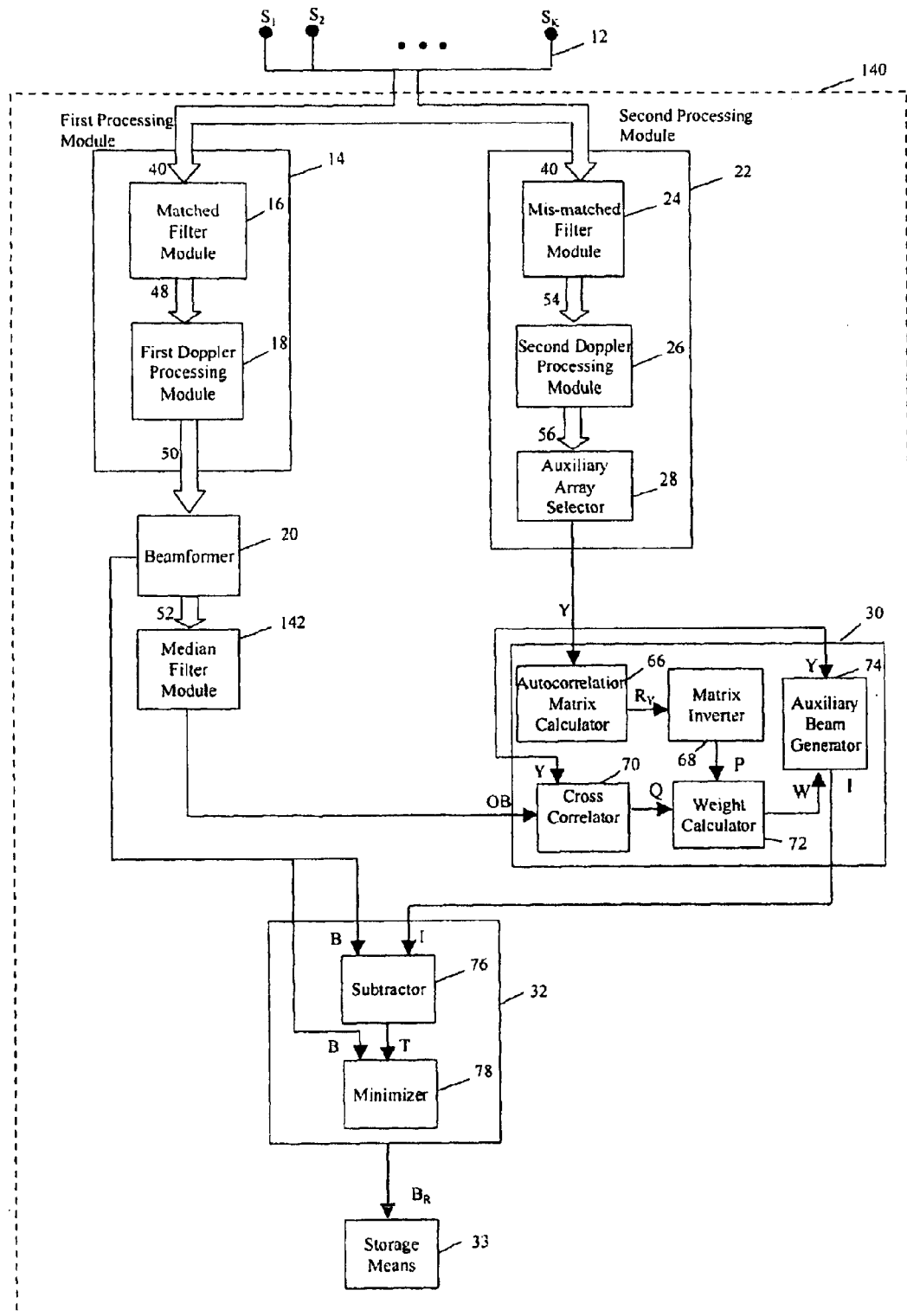
FIG. 9 is an alternative embodiment of the noise suppression system in accordance with the present invention.

Referring now to FIG. 9, shown therein is a noise suppression system 140 which incorporates a median filter module 142 that is coupled to the beamformer 20 and the adaptive beamformer 30. The rest of the noise suppression system 140 is similar to the noise suppression system 10 and will not be discussed. The median filter module 142 performs median filtering, as was just described, on the beamformed matched range-doppler-azimuth data 58. The median filter module 142 preferably uses a value of 1.75 for the constant v. This value was determined empirically and may be changed if the results are not satisfactory. For instance, there may be situations in which the ionospheric clutter is extremely severe in which case the value of the constant v must be decreased to remove more ionospheric clutter. The median filter module 142 may operate column-wise on each range vector that makes up the beamformed matched range-doppler-azimuth data 58 produced by the beamformer 20. A vector OB, which is a portion of the median filtered beamformed matched range-doppler-azimuth data, is provided to the adaptive beamformer 30 so that the external interference estimate may be generated and subtracted from the portion of the matched radar data as previously discussed.

As an alternative, other ordered statistics filtering methods may be used in place of median filtering. One such example consists of choosing a constant integer g (i.e. such 15), ordering the values in the vector B', removing the g highest and g lowest values, averaging the remainder of the values to obtain a mean value and then generating a threshold by multiplying the mean value by a constant. In general, a filter can be designed to prevent unwanted signals by looking at the interference statistics, bandwidth and other features. Accordingly, the median filter module 142 may be generally represented by an ordered-statistics filter module.

Figure 10:
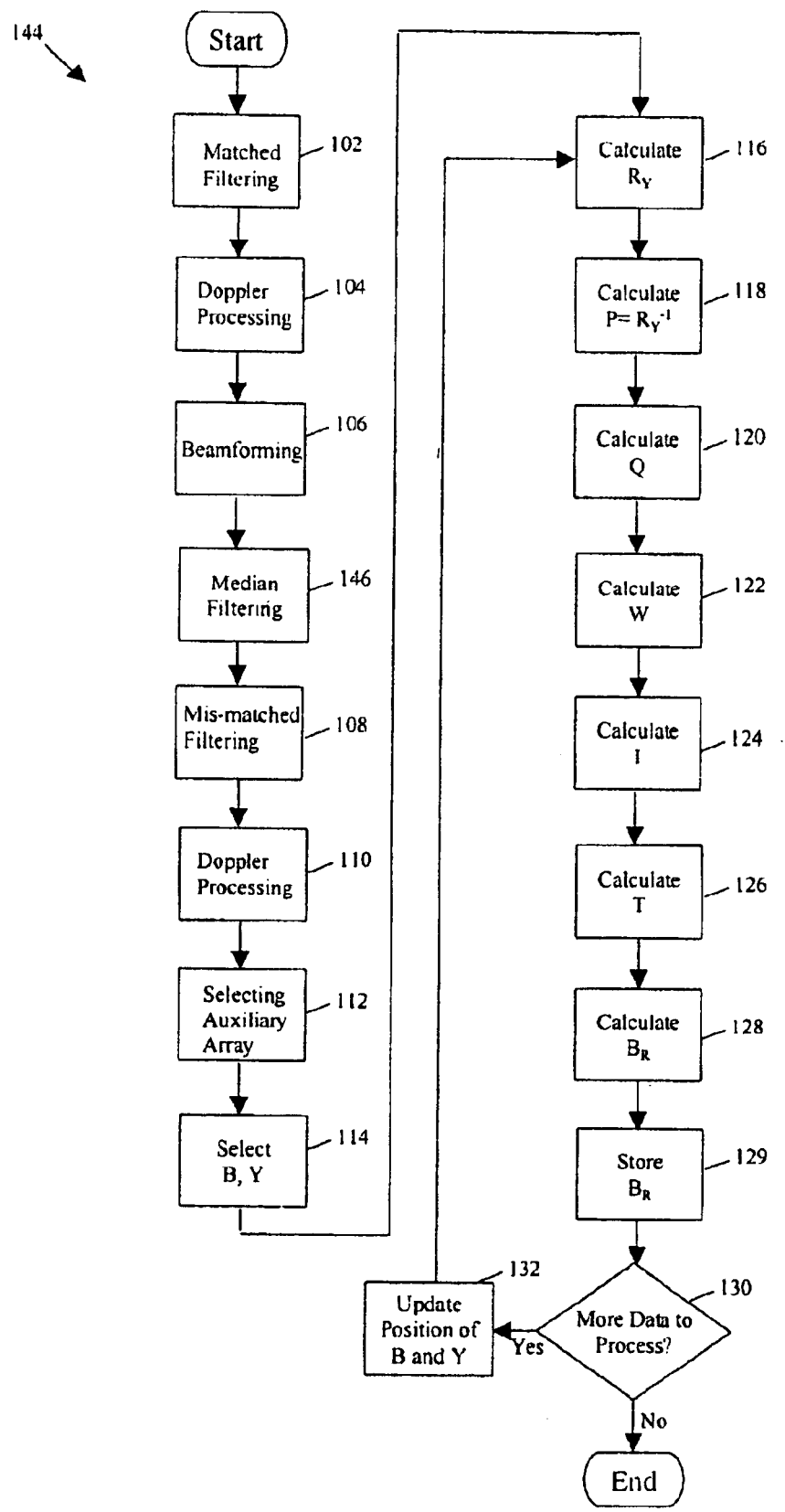
FIG. 10 is a flowchart of an alternative noise suppression method in accordance with the noise suppression system of FIG. 9.

Referring now to FIG. 10, shown therein is an alternative noise suppression method 144 which incorporates a median filtering step 146 to perform median filtering on the matched range-doppler-azimuth data as described above. The rest of the noise suppression method 144 is identical to the noise suppression method 100 and will not be described. As described above, another ordered-statistic filtering method may be used instead of median filtering.

Referring now to FIG. 11a, shown therein is an example of a range-doppler plot of real radar data having two simulated targets. The range-doppler plot is obtained from the beamformer 20 for a given azimuth value. Each target is at a range of 245 km with one target having a doppler frequency of 2 Hz and the other target having a doppler frequency of −2 Hz. Both targets have an azimuth or bearing of 60 degrees relative to the center of the main sensor array. The external interference appears across the range dimension at a doppler frequency range of approximately −2 to −4 Hz. The external interference overlaps and hides the target having a doppler frequency of −2 Hz. Accordingly, detection of this target is very difficult due the external interference.

Figure 11B:
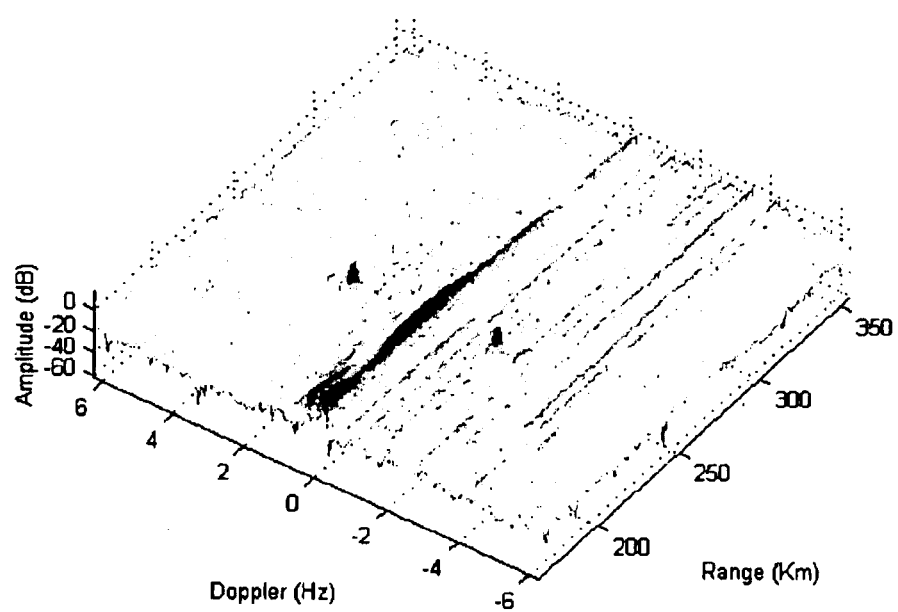
FIG. 11b is a range-doppler plot of the radar data of FIG. 11a in which the noise suppression method of the present invention is used.

Referring now to FIG. 11b, shown therein is a range-doppler plot of the radar data shown in FIG. 11a after applying the noise suppression method 100. As can be seen, the external interference has been suppressed and the target having a doppler frequency of −2 Hz, which was previously hidden in external interference, can now been seen with no apparent loss in amplitude.

Figure 11C:
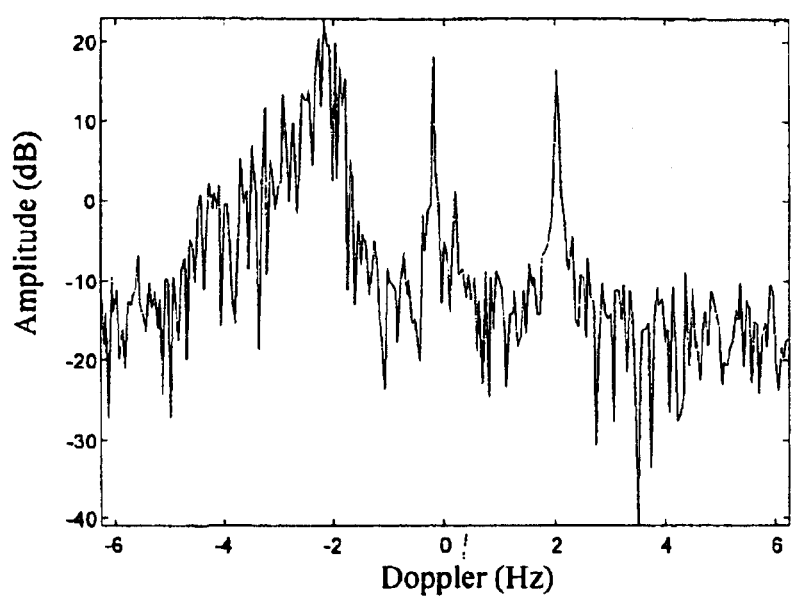
FIG. 11c is a plot showing a slice along the doppler dimension of the range-doppler plot of FIG. 11a at a range of 242 km.
Figure 11D:
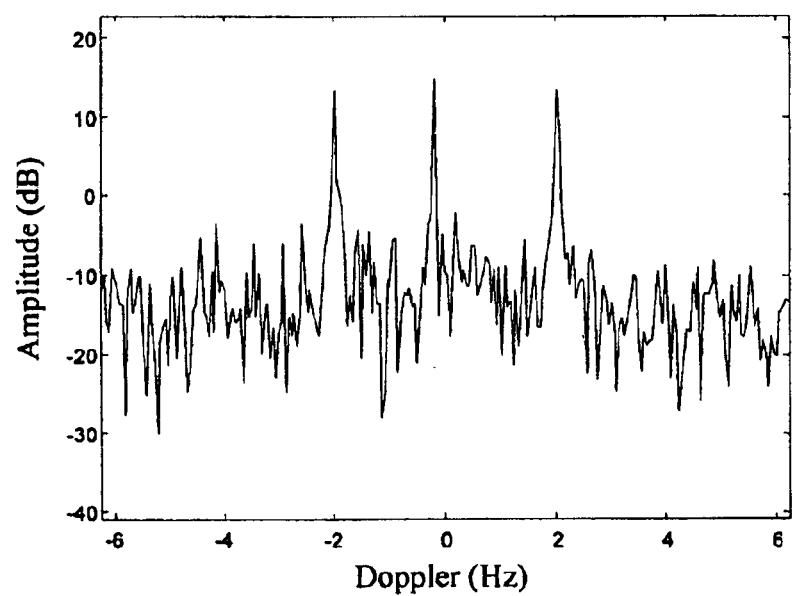
FIG. 11d is a plot showing a slice along the doppler dimension of the range-doppler plot of FIG. 11b at a range of 242 km.

Referring now to FIGS. 11c and 11d, a slice along the doppler dimension of the range-doppler plots from FIGS. 11a and 11b are shown for a range of 245 km. The radar data in FIG. 11c has not been subjected to the noise suppression method 100 while the radar data in FIG. 11d has been subjected to the noise suppression method 100. The results indicate that the noise suppression method 100 has suppressed the external interference by a factor of 30 dB without degrading target amplitude.

Figure 12A:
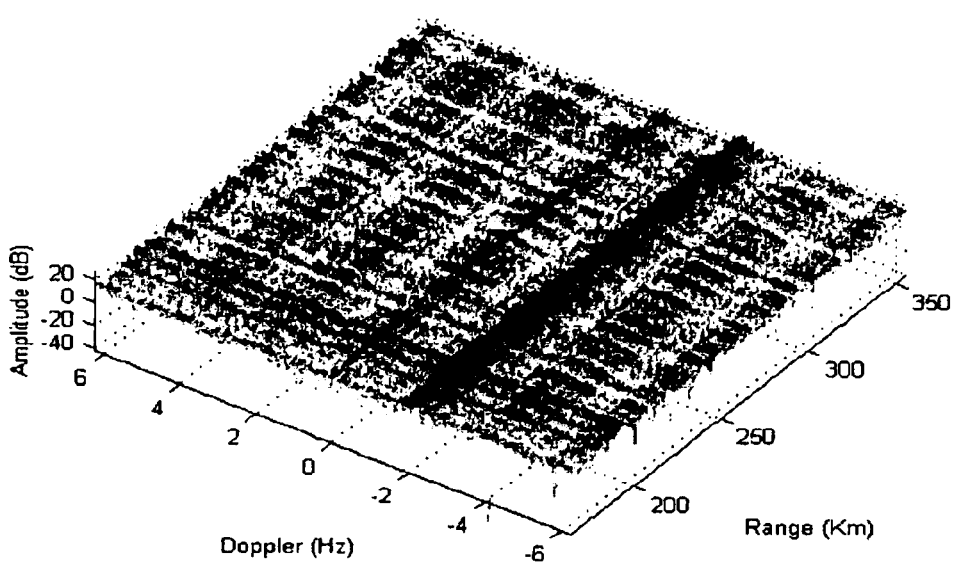
FIG. 12a is a range-doppler plot of another example of radar data containing impulsive noise and simulated targets in which the noise suppression method of the present invention is not used.
Figure 12B:
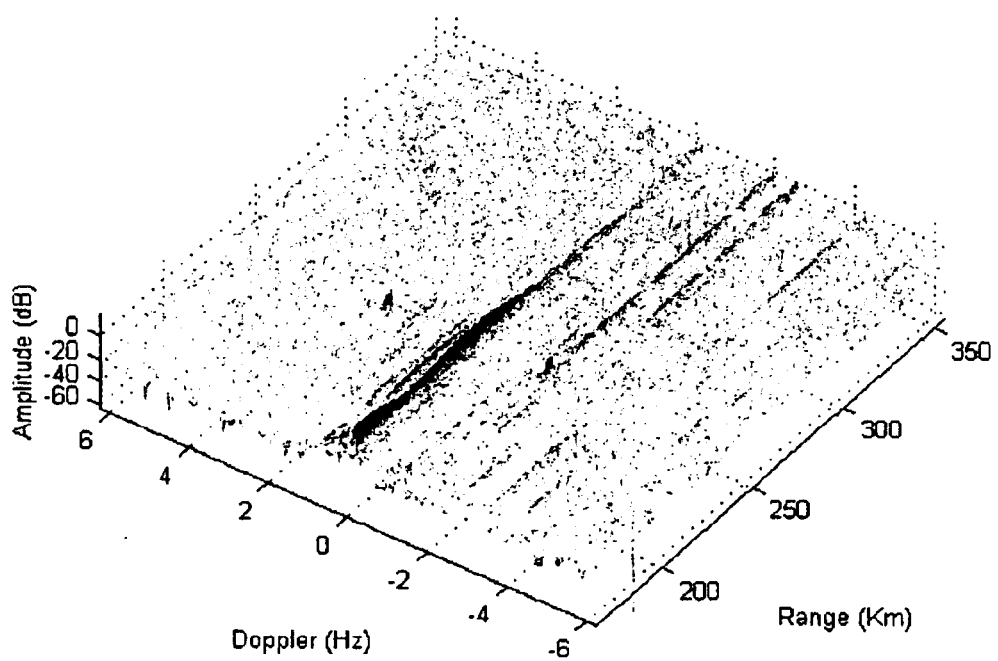
FIG. 12b is a range-doppler plot of the radar data of FIG. 12a in which the noise suppression method of the present invention is used.

The performance of the noise suppression method 100 was also evaluated for the case of suppressing both impulsive noise and co-channel interference. Referring now to FIG. 12a, a range-doppler plot produced by the beamformer 20 is shown for radar data which is corrupted by both impulsive noise and external interference. The simulated targets from the radar data of FIGS. 11a to 11d have been added to this radar data. The result after applying the noise suppression method 100 is shown in FIG. 12b. This result indicates that both the impulsive noise and the external interference have been suppressed while the targets, at a range of approximately 245 km and doppler frequencies of 2 Hz and −2 Hz, have been successfully extracted from the external interference.

Figure 12C:
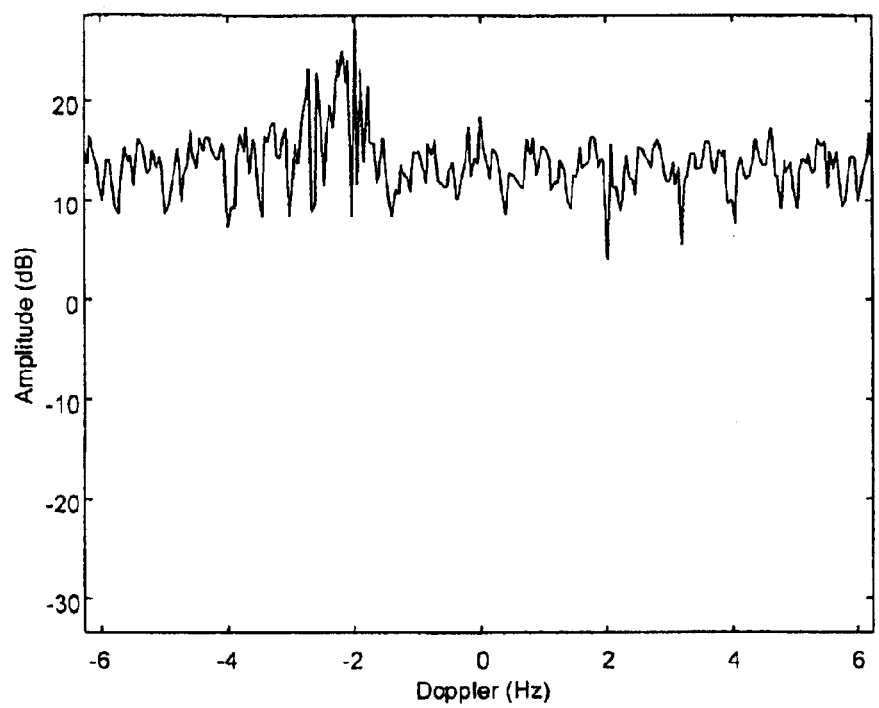
FIG. 12c is a plot showing a slice along the doppler dimension of the range-doppler plot of FIG. 12a at a range of 242 km.
Figure 12D:
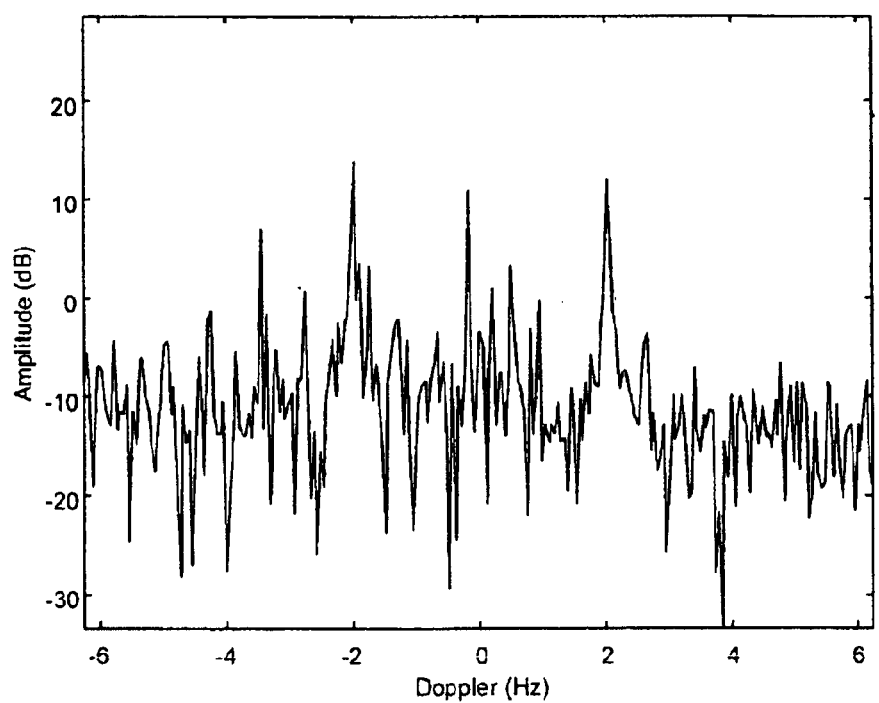
FIG. 12d is a plot showing a slice along the doppler dimension of the range-doppler plot of FIG. 12b at a range of 242 km.

Referring now to FIGS. 12c and 12d, a slice along the doppler dimension of the range-doppler plots from FIGS. 12a and 12b are shown at the range of the targets. The data in FIG. 12c has not been subjected to the noise suppression method 100 while the data in FIG. 12d has been subjected to the noise suppression method 100. The results indicate that the noise suppression method 100 has suppressed the external interference by a factor of 20 to 30 dB without degrading target amplitude. Also apparent from the radar data is the fact that impulsive noise results in an increase in the noise floor (i.e. the noise floor in FIG. 12c is approximately 10 dB while the noise floor in FIG. 12d is approximately −15 dB).

Figure 13A:
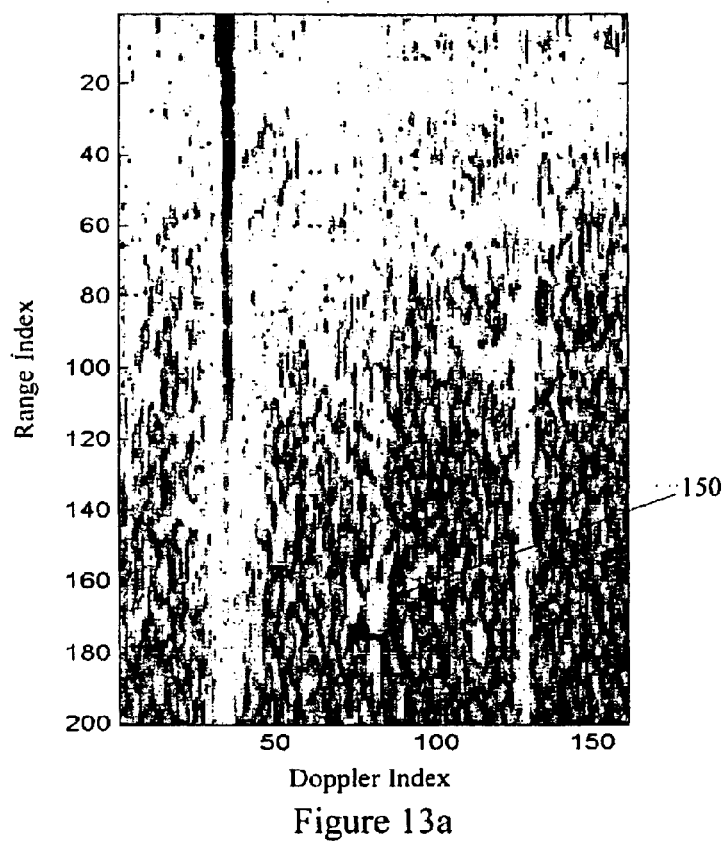
FIG. 13a is a range-doppler plot of another example of radar data containing weak external interference and a real target in which the noise suppression method of the present invention is not used.
Figure 13B:
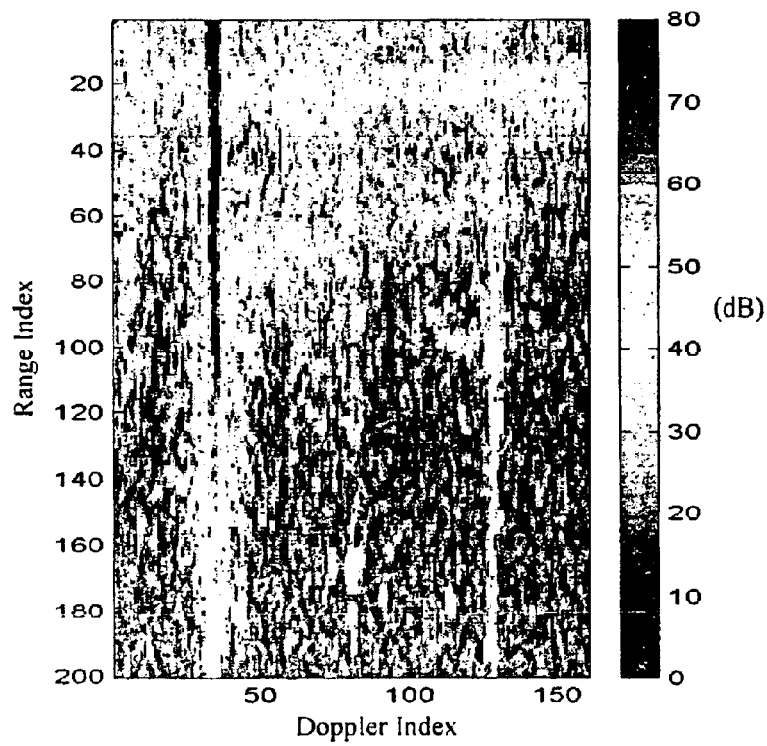
FIG. 13b is a range-doppler plot of the radar data of FIG. 13a in which the noise suppression method of the present invention is used.

The noise suppression method 100 of the present invention has to maintain the Direction Of Arrival (DOA) (i.e. the azimuth or bearing) of a target in the presence of weak external interference. Referring to FIG. 13a, shown therein is a range-doppler plot for an example of real radar data having a real target 150. This data has not been subjected to the noise suppression method 100 of the present invention. The target 150 is located at a range index of approximately 167 and a doppler index of approximately 80. Referring to FIG. 13b, shown therein is a range-doppler plot of the real radar data of FIG. 13a after subjecting the range-doppler data to the noise suppression method 100. The range-doppler plots of FIGS. 13a and 13b are quite similar in appearance.

Figure 13C:
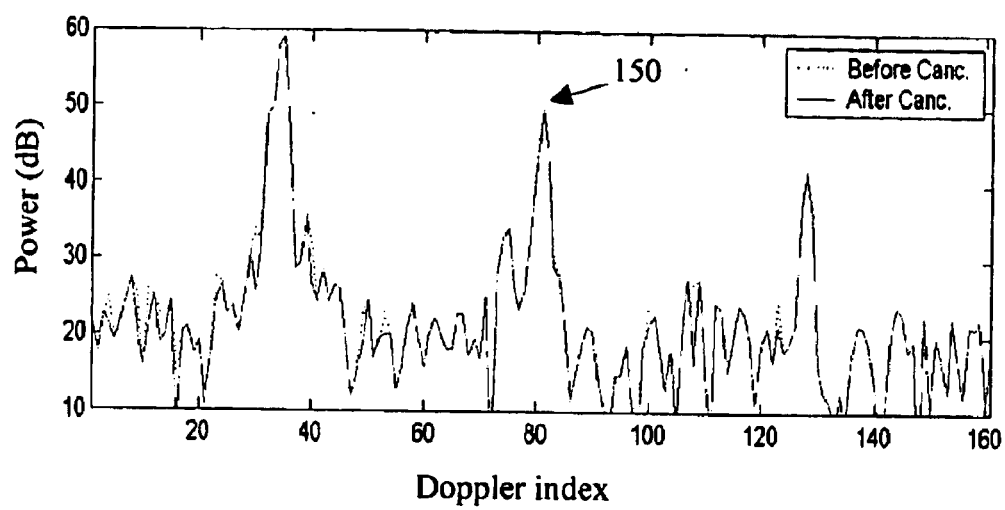
FIG. 13c shows two plots of the data of FIGS. 13a and 13b along the doppler dimension at the target range.

Referring now to FIG. 13c, shown therein are slices along the doppler dimension of the range-doppler plots of FIGS. 10a and 10b at the range of the target. The results show that the noise suppression method 100 retains the amplitude of the target in the doppler dimension in the presence of weak external interference.

Figure 13D:
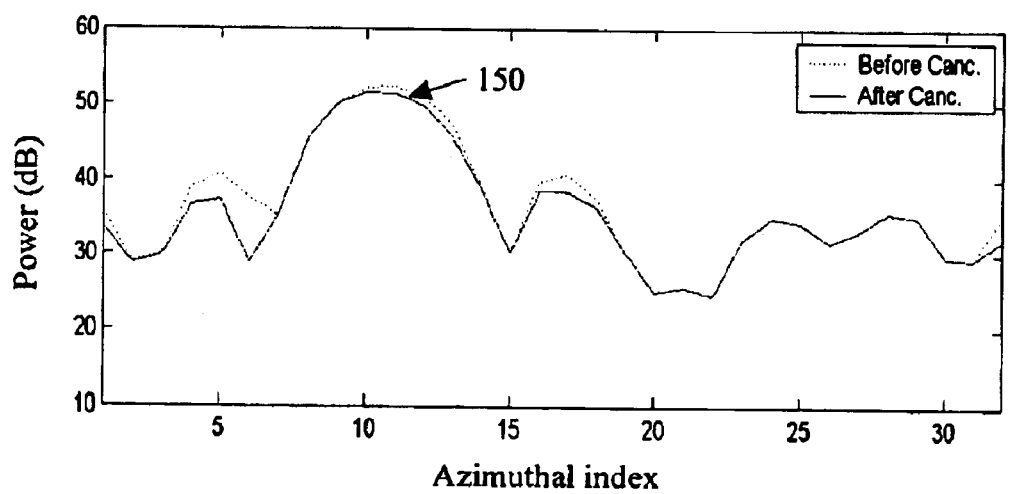
FIG. 13d shows two azimuth plots of the data of FIGS. 13a and 13b at the doppler and range index of the target.

Referring now to FIG. 13d, shown therein are azimuth plots of the radar data of FIGS. 13a and 13b for the range index and doppler index of the target. The results show that the noise suppression method 100 retains the DOA of the target in weak external interference.

Figure 14A:
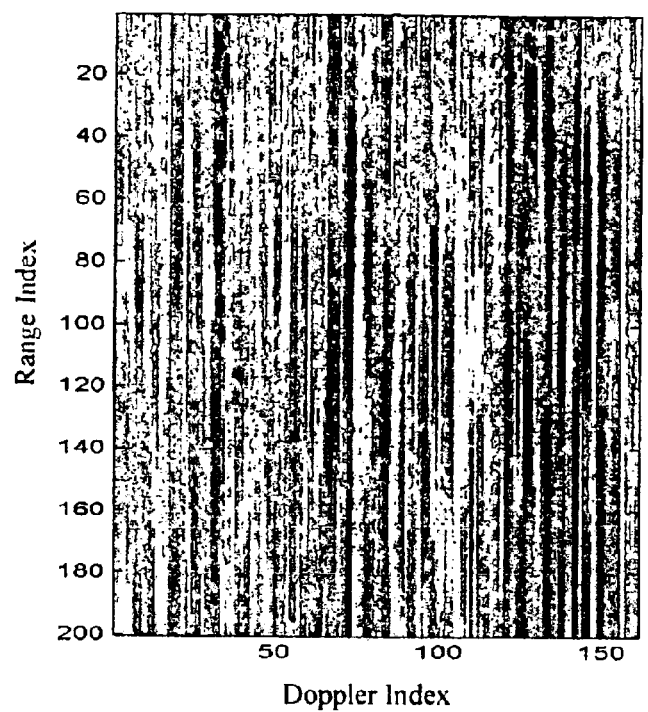
FIG. 14a is a range-doppler plot of another example of radar data containing strong external interference and a real target in which the noise suppression method of the present invention is not used.
Figure 14B:
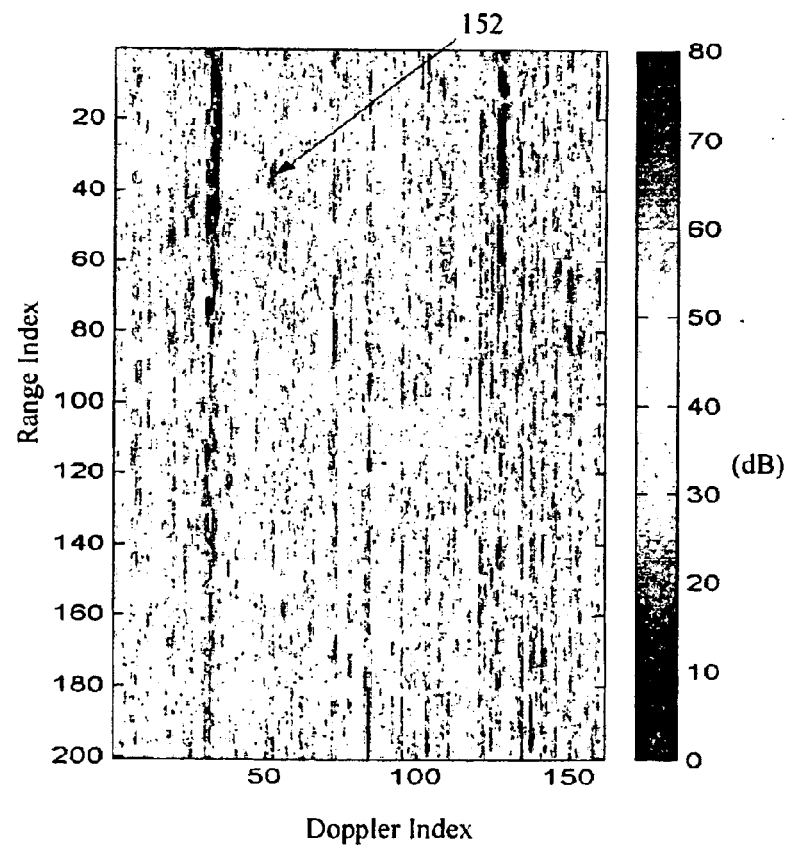
FIG. 14b is a range-doppler plot of the radar data of FIG. 14a in which the noise suppression method of the present invention is used.

Referring now to FIG. 14a, shown therein is a range-doppler plot for another example of real radar data having a real target 152. This radar data has not been subjected to the noise suppression method 100. The target 152 is located at a range index of approximately 36 and a doppler index of approximately 52. The external interference is very strong and the target 152 cannot be seen. Referring now to FIG. 14b, shown therein is a range-doppler plot of the real radar data of FIG. 14a, after subjecting the radar data to the noise suppression method 100. The noise level due to the external interference has been reduced by a factor of 20 dB and the target 152 is now visible.

Figure 14C:
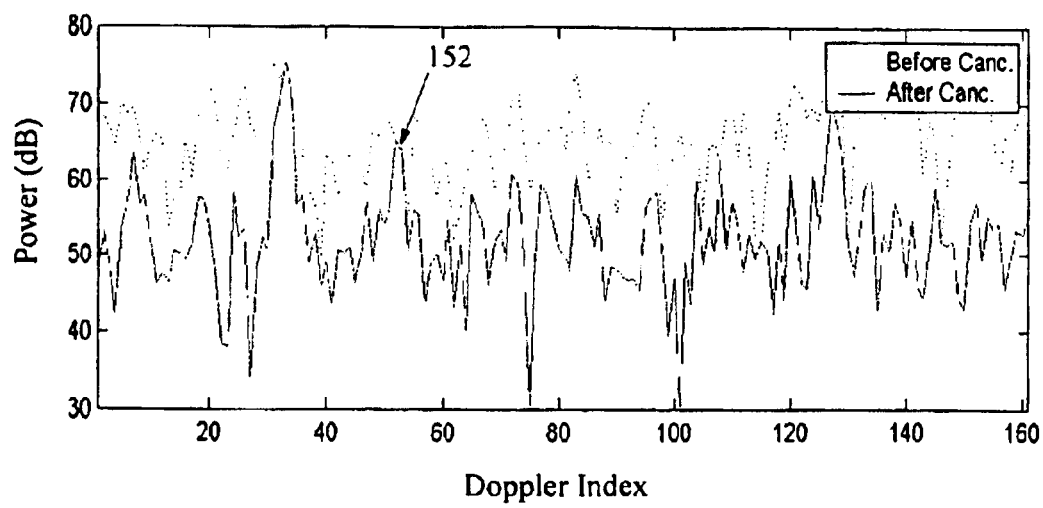
FIG. 14c shows two plots of the data of FIGS. 14a and 14b along the doppler dimension at the target range; and, FIG. 14d shows two azimuth plots of the data of FIGS. 14a and 14b at the doppler and range index of the target.
Figure 14D:
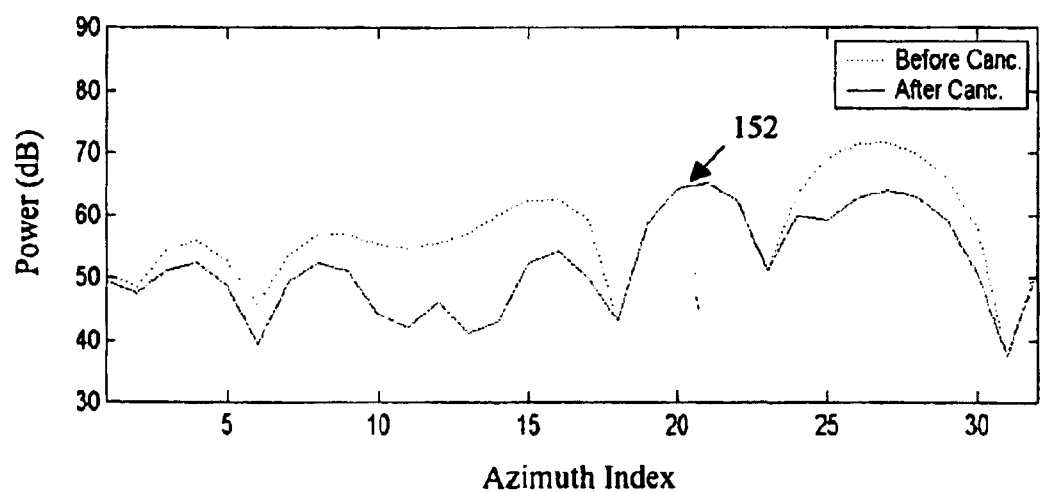

Referring now to FIGS. 14c and 14d, FIG. 14c shows slices along the doppler dimension of the range-doppler plot of FIGS. 14a and 14b at the range of the target and FIG. 14d shows azimuth plots at the range and doppler frequency of the target 152. Both FIGS. 14c and 14d show the radar data before and after the application of the noise suppresssion method 100. In both cases, it is clear that the noise surrounding the target 152 has been suppressed and that the target's amplitude and DOA have been maintained by the noise suppression method 100.

It should be understood that various modifications can be made to the preferred embodiments described and illustrated herein without departing from the present invention, the scope of which is defined in the appended claims. For instance, instead of using the FFT operator in converting the range-doppler-sensor data to range-doppler-azimuth data, a high-resolution spectral estimator such as the MUSIC spectral estimator may be used. Furthermore, the method of the present invention may also be applied to the prior art cases discussed previously in which a separate physical auxiliary antenna array is used to provide an estimate of the interference in the main beam. In this case, the output of the auxiliary antenna would be processed by mis-matched filtering and the output of the main antenna array would be processed by matched filtering. The method may also be extended to the situation in which some of the sensors from the main sensor array are used for interference estimation only. In this case, the data from these sensors would be processed by mis-matched filtering while the data from sensors used to construct the main beam would be processed by matched filtering. In addition, the invention may be applicable for any phased-array based applications that send pulses or waveforms for source identification such as ultrasound imaging systems, speed detection radars, sidescan sonars, active sonars, underwater fish finders and seismic applications.

What is claimed is:

1. A noise suppression system for suppressing external interference in radar data provided by a plurality of sensors from a main sensor array, said radar data being pre-processed, said system comprising:
   a) a first processing module for receiving said radar data and producing matched radar data;
   b) a second processing module for receiving said radar data and producing mis-matched radar data;
   c) a beamformer in communication with said first processing module for receiving said matched radar data and producing beamformed matched radar data;
   d) an adaptive beamformer in communication with said second processing module and said beamformer for receiving a portion of said beamformed matched radar data and a portion of said mis-matched radar data, and producing an external interference estimate of the external interference in said portion of beamformed matched radar data; and,
   e) a suppressor in communication with said beamformer and said adaptive beamformer for producing a portion of noise suppressed beamformed matched radar data based on said portion of beamformed matched radar data and said external interference estimate.

2. The system of claim 1, wherein said first processing module comprises:
   a) a matched filter module for receiving said radar data and producing matched range-pulse-sensor data; and,
   b) a first doppler processing module in communication with said matched filter module for receiving said matched range-pulse-sensor data and producing matched range-doppler-azimuth data.

3. The system of claim 1, wherein said second processing module comprises:
   a) a mis-matched filter module for receiving said radar data and producing mis-matched range-pulse-sensor data;
   b) a second doppler processing module in communication with said mis-matched filter module for receiving said mis-matched range-pulse-sensor data and producing mis-matched range-doppler-sensor data; and,
   c) an auxiliary array selector in communication with said second doppler processing module for selecting at least a portion of said plurality of sensors to construct a virtual auxiliary sensor array and provide mis-matched range-doppler-sensor data for said virtual auxiliary sensor array.

4. The system of claim 1, wherein said second processing module comprises:
   a) a mis-matched filter module for receiving said radar data and producing mis-matched range-pulse-sensor data;
   b) an auxiliary array selector in communication with said mis-matched filter module for selecting at least a portion of said plurality of sensors to construct a virtual auxiliary sensor array and provide mis-matched range-pulse-sensor data for said virtual auxiliary sensor array; and,
   c) a second doppler processing module in communication with said auxiliary array selector, for receiving said mis-matched range-pulse-sensor data from said virtual auxiliary sensor array and producing mis-matched range-doppler-sensor data for said virtual auxiliary sensor array.

5. The system of claim 1, wherein said second processing module comprises:
   a) an auxiliary array selector for selecting at least a portion of said plurality of sensors to construct a virtual auxiliary sensor array and provide radar data from said virtual auxiliary sensor array;
   b) a mismatched filter module in communication with said auxiliary array selector, for receiving said radar data from said virtual auxiliary sensor array and producing mis-matched range-pulse-sensor data for said auxiliary sensor array; and,
   c) a second doppler processing module in communication with said mis-matched filter module, for receiving said mis-matched range-pulse-sensor data and producing mis-matched range-doppler-sensor data for said auxiliary sensor array.

6. The system of claim 1, wherein said second processing module comprises an auxiliary array selector for constructing a virtual auxiliary sensor array from each of said plurality of sensors.

7. The system of claim 1, wherein said second processing module comprises an auxiliary array selector for selecting a portion of said plurality of sensors, said portion of said plurality of sensors having a zero phase center that is far removed from the zero phase center of said main sensor array.

8. The system of claim 1, wherein said second processing module comprises an auxiliary array selector for selecting a portion of said plurality of sensors, said portion of said plurality of sensors having an aperture that is equal to the aperture of said main sensor array.

9. The system of claim 1, wherein said adaptive beamformer comprises:
   a) an autocorrelation matrix calculator in communication with said second processing module for calculating the autocorrelation matrix of said portion of mis-matched radar data;

b) a matrix inverter in communication with said autocorrelation matrix calculator for providing an inverse autocorrelation matrix;

c) a cross-correlator in communication with said beamformer and said second processing module for providing the cross-correlation of said portion of mis-matched radar data and said portion of beamformed matched radar data;

d) a weight calculator in communication with said matrix inverter and said cross-correlator for calculating an adaptive weight vector based on said inverse autocorrelation matrix and said cross-correlation; and, e) an auxiliary beam generator in communication with said second processing module and said weight calculator for providing said external interference estimate based on said adaptive weight vector and said portion of mis-matched radar data.

10. The system of claim 1, wherein said suppressor comprises:

a) a subtractor in communication with said beamformer and said adaptive beamformer for subtracting said external interference estimate from said portion of beamformed matched radar data to provide a subtraction signal; and, b) a minimizer in communication with said suppressor and said beamformer for producing said portion of noise suppressed beamformed matched radar data based on said subtraction signal and said portion of beamformed matched radar data.

11. The system of claim 1, wherein said system further comprises an ordered-statistics filter module in communication with said beamformer and said adaptive beamformer for providing ordered-statistics filtered beamformed matched radar data to said adaptive beamformer.

12. The system of claim 11, wherein said ordered-statistics filter module is a median filter module.

13. The system of claim 11, wherein said adaptive beamformer comprises:

a) an autocorrelation matrix calculator in communication with said second processing module for calculating the autocorrelation matrix of said portion of mis-matched radar data;

b) a matrix inverter in communication with said autocorrelation matrix calculator for producing an inverse autocorrelation matrix;

c) a cross-correlator in communication with said ordered-statistics filter module and said second processing module for producing the cross-correlation of said portion of mis-matched radar data and a portion of said ordered-statistics filtered beamformed matched radar data;

d) a weight calculator in communication with said matrix inverter and said cross-correlator for calculating an adaptive weight vector based on said inverse autocorrelation matrix and said cross-correlation; and, e) an auxiliary beam generator in communication with said second processing module and said weight calculator for providing said external interference estimate based on said adaptive weight vector and said portion of mis-matched radar data.

14. The system of claim 1, wherein said system further comprises a storage means for storing said portion of noise suppressed beamformed matched radar data.

15. A noise suppression method for suppressing external interference in radar data provided by a plurality of sensors from a main sensor array, said radar data being pre-processed, said method comprising:

a) processing said radar data to produce matched radar data;

b) processing said radar data to produce mis-matched radar data;

c) beamforming said matched radar data to produce beamformed matched radar data;

d) selecting a portion of said beamformed matched radar data and a portion of said mis-matched radar data and performing adaptive beamforming to produce an external interference estimate of the external interference in said beamformed matched radar data; and, e) producing a portion of noise suppressed beamformed matched radar data by suppressing said external interference estimate from said portion of beamformed matched radar data.

16. The method of claim 15, wherein step (a) comprises:

i) match filtering said radar data to produce matched range-pulse-sensor data; and, ii) doppler processing said matched range-pulse-sensor data to produce matched range-doppler-azimuth data.

17. The method of claim 15, wherein step (b) comprises:

i) mis-match filtering said radar data to produce mis-matched range-pulse-sensor data;

ii) doppler processing said mis-matched filter range-pulse-sensor data to produce mis-matched range-pulse-doppler data; and, iii) constructing a virtual auxiliary array from at least a portion of said plurality of sensors to provide mis-matched range-doppler-sensor data for said virtual auxiliary sensor array.

18. The method of claim 15, wherein step (b) comprises:

i) mis-match filtering said radar data to produce mis-matched range-pulse-sensor data;

ii) constructing a virtual auxiliary array from at least a portion of said plurality of sensors to provide mis-matched range-pulse-sensor data for said virtual auxiliary sensor array; and, iii) doppler processing said mis-matched range-pulse-sensor data from said virtual auxiliary sensor array to produce mismatched range-pulse-doppler data for said virtual auxiliary sensor array.

19. The method of claim 15, wherein step (b) comprises:

i) constructing a virtual auxiliary array from at least a portion of said plurality of sensors to provide radar data for said virtual auxiliary sensor array;

ii) mis-match filtering said radar data from said virtual auxiliary sensor array to produce mis-matched range-pulse-sensor data for said virtual auxiliary sensor array; and, iii) doppler processing said mis-matched range-pulse-sensor data to produce mis-matched range-pulse-doppler data for said virtual auxiliary sensor array.

20. The method of claim 15, wherein step (b) comprises constructing a virtual auxiliary sensor array by selecting each sensor from said plurality of sensors.

21. The method of claim 15, wherein step (b) comprises constructing a virtual auxiliary sensor array from a portion of said plurality of sensors having a zero phase center that is far removed from the zero phase center of said main sensor array.

22. The method of claim 15, wherein step (b) comprises a portion of said plurality of sensors having an aperture that is equal to the aperture of said main sensor array.

23. The method of claim 15, wherein step (d) comprises:
i) autocorrelating said portion of mis-matched radar data to produce an autocorrelation matrix;
ii) inverting said autocorrelation matrix to produce an inverse autocorrelation matrix;
iii) cross-correlating said portion of mis-matched radar data and said portion of beamformed matched radar data to produce a cross-correlation vector;
iv) calculating an adaptive weight vector; and,
v) generating an interference beam to produce an external interference estimate.

24. The method of claim 15, wherein step (e) comprises:
i) subtracting said external interference estimate from said portion of beamformed matched radar data to produce a subtraction signal; and,
ii) producing said portion of noise suppressed beamformed matched radar data based on said subtraction signal and said portion of beamformed matched radar data.

25. The method of claim 15, wherein said method further comprises performing ordered-statistics filtering on said beamformed matched radar data to produce ordered-statistics filtered beamformed matched radar data.

26. The method of claim 25, wherein said ordered-statistics filtering comprises median filtering.

27. The method of claim 25, wherein step (c) comprises:
i) autocorrelating said portion of mis-matched radar data to produce an autocorrelation matrix;
ii) inverting said autocorrelation matrix to produce an inverse autocorrelation matrix;
iii) cross-correlating said portion of mis-matched radar data and a portion of said ordered-statistics filtered beamformed matched radar data to produce a cross-correlation vector;
iv) calculating an adaptive weight vector; and,
v) generating an interference beam to produce an external interference estimate.

28. The method of claim 15, wherein said method further comprises:
(f) storing said portion of noise suppressed beamformed matched radar data.

29. A noise suppression system for suppressing external interference in radar data provided by a plurality of sensors from a main sensor array, said radar data being pre-processed, said system comprising:
a) a first processing module for receiving said radar data and producing matched radar data;
b) a second processing module for receiving said radar data and producing mis-matched radar data;
c) a beamformer in communication with said first processing module for receiving said matched radar data and producing beamformed matched radar data;
d) an ordered-statistics filter module, in communication with said beamformer for receiving said beamformed matched radar data from said beamformer and producing ordered-statistics filtered beamformed matched radar data;
e) an adaptive beamformer in communication with said second processing module and said ordered-statistics filter module for receiving a portion of said ordered-statistics filtered beamformed matched radar data and a portion of said mismatched radar data, and producing an external interference estimate of the external interference in a portion of said beamformed matched radar data; and,
f) a suppressor in communication with said beamformer and said adaptive beamformer for producing a portion of noise suppressed beamformed matched radar data based on said portion of beamformed matched radar data and said external interference estimate.

30. A noise suppression method for suppressing external interference in radar data provided by a plurality of sensors from a main sensor array, said radar data being pre-processed, said method comprising:
a) processing said radar data to produce matched radar data;
b) processing said radar data to produce mis-matched radar data;
c) beamforming said matched radar data to produce beamformed matched radar data;
d) performing ordered-statistic filtering on said beamformed matched radar data to produce ordered-statistic filtered beamformed matched radar data;
e) selecting a portion of said ordered-statistic filtered beamformed matched radar data and a portion of said mis-matched radar data and performing adaptive beamforming to provide an external interference estimate of the external interference in a portion of said beamformed matched radar data; and,
f) producing a portion of noise suppressed beamformed matched radar data by suppressing said external interference estimate from said portion of beamformed matched radar data.

* * * * *

UNITED STATES PATENT AND TRADEMARK OFFICE
CERTIFICATE OF CORRECTION

PATENT NO. : 6,867,731 B2
DATED : March 15, 2005
INVENTOR(S) : Dizaji et al.

It is certified that error appears in the above-identified patent and that said Letters Patent is hereby corrected as shown below:

Column 8,
Line 60, delete "filer" and replace with -- filter --.

Column 10,
Line 36, delete "mismatched" and replace with -- mis-matched --.

Column 12,
Line 38, delete "may replaced" and replace with -- may be replaced --.

Column 13,
Line 25, delete "three dimensional" and replace with -- three-dimensional --.

Column 21,
Line 53, delete "due the" and replace with -- due to the --.
Line 59, delete "been seen" and replace with -- be seen --.

Column 24,
Line 39, delete "mismatched" and replace with -- mis-matched --.

Column 26,
Line 42, delete "mismatched" and replace with -- mis-matched --.

Signed and Sealed this

Twenty-first Day of February, 2006

JON W. DUDAS
*Director of the United States Patent and Trademark Office*